United States Patent
Wachi et al.

(10) Patent No.: US 8,653,800 B2
(45) Date of Patent: Feb. 18, 2014

(54) STEP-UP SWITCHING POWER SUPPLY DEVICE WITH CURRENT-LIMITING TRANSISTOR

(75) Inventors: Takatsugu Wachi, Kyoto (JP); Masashi Nagasato, Kyoto (JP); Yuki Iwata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 383 days.

(21) Appl. No.: 12/792,198

(22) Filed: Jun. 2, 2010

(65) Prior Publication Data
US 2010/0308655 A1    Dec. 9, 2010

(30) Foreign Application Priority Data
Jun. 3, 2009    (JP) ................................. 2009-133811

(51) Int. Cl.
*G05F 1/618*    (2006.01)
*H02M 3/156*    (2006.01)

(52) U.S. Cl.
USPC ............................ 323/222; 323/225; 323/271

(58) Field of Classification Search
USPC .................. 323/222, 225, 267, 271, 282, 908
See application file for complete search history.

(56) References Cited

U.S. PATENT DOCUMENTS

| | | | | |
|---|---|---|---|---|
| 7,148,668 B1* | 12/2006 | Collins | | 323/282 |
| 7,479,773 B2* | 1/2009 | Michishita | | 323/282 |
| 7,973,521 B2* | 7/2011 | Chen et al. | | 323/273 |
| 8,143,873 B2* | 3/2012 | Hane | | 323/282 |
| 2007/0085515 A1* | 4/2007 | Nishida | | 323/225 |
| 2008/0079410 A1* | 4/2008 | Ishii et al. | | 323/284 |
| 2008/0122291 A1* | 5/2008 | Uchimoto et al. | | 307/31 |
| 2008/0203984 A1* | 8/2008 | Omi | | 323/272 |
| 2010/0007999 A1* | 1/2010 | Iwata | | 361/18 |

FOREIGN PATENT DOCUMENTS

JP    2006-304500    11/2006

* cited by examiner

*Primary Examiner* — Adolf Berhane
*Assistant Examiner* — Fred E Finch, III
(74) *Attorney, Agent, or Firm* — Fish & Richardson P.C.

(57) ABSTRACT

The step-up DC/DC converter (30) of the present invention has a synchronous rectifier transistor (M1); an output transistor (M2); a first back-gate control transistor (M3) connected between an external terminal (T2) and a back gate of the synchronous rectifier transistor (M1); a discharge transistor (M6) connected between the external terminal (T2) and a ground terminal; and a control unit (X1) for controlling the on/off state of the components described above. The control unit (X1) switches off the first back-gate control transistor (M3) and switches on the discharge transistor (M6) when stopping the switching operation of the output transistor (M2) and the synchronous rectifier transistor (M1).

18 Claims, 27 Drawing Sheets

FIG.2

| TERMINAL NO. | TERMINAL NAME | FUNCTION |
|---|---|---|
| 1 | CSWON | CURRENT SWITCH CONTROL TERMINAL (ON WHEN CSWON = HIGH) |
| 2 | DCSW1 | 1.2 V OUTPUT STEP-DOWN DC/DC CONVERTER SWITCHING TERMINAL |
| 3 | PVCC1 | 1.2 V OUTPUT STEP-DOWN DC/DC CONVERTER POWER SUPPLY INPUT TERMINAL |
| 4 | VDCO1 | 1.2 V OUTPUT STEP-DOWN DC/DC CONVERTER FEEDBACK TERMINAL |
| 5 | PGND1 | 1.2 V OUTPUT STEP-DOWN DC/DC CONVERTER GND TERMINAL |
| 6 | PGND2 | 3.3 V OUTPUT STEP-DOWN DC/DC CONVERTER GND TERMINAL |
| 7 | VDCO2 | 3.3 V OUTPUT STEP-DOWN DC/DC CONVERTER FEEDBACK TERMINAL |
| 8 | PVCC2 | 3.3 V OUTPUT STEP-DOWN DC/DC CONVERTER POWER SUPPLY INPUT TERMINAL |
| 9 | DCSW2 | 3.3 V OUTPUT STEP-DOWN DC/DC CONVERTER SWITCHING TERMINAL |
| 10 | ENUP | STEP-UP DC/DC CONVERTER ENABLE TERMINAL (START STEP-UP DC/DC WHEN ENUP = HIGH) |
| 11 | DCSW3 | STEP-UP DC/DC CONVERTER SWITCHING TERMINAL |
| 12 | PGND3 | STEP-UP DC/DC CONVERTER GND TERMINAL |
| 13 | VDCO3 | STEP-UP DC/DC CONVERTER OUTPUT TERMINAL |
| 14 | AGND | ANALOG UNIT GND TERMINAL |
| 15 | FB3 | STEP-UP DC/DC CONVERTER FEEDBACK TERMINAL |
| 16 | XRESET | RESET OUTPUT TERMINAL |
| 17 | LEDO | LED DRIVER OUTPUT TERMINAL |
| 18 | AVCC | ANALOG UNIT POWER SUPPLY TERMINAL |
| 19 | CSWO | CURRENT SWITCH OUTPUT TERMINAL |
| 20 | XLEDON | LED DRIVER CONTROL TERMINAL (ON WHEN XLEDON = LOW) |
| BACKSIDE PAD | GND | GND PAD FOR HEAT DISSIPATION |

FIG.4

| ITEM | SYMBOL | SPECIFICATION | UNIT | CONDITIONS |
|---|---|---|---|---|
| OVERALL | | | | |
| CURRENT CONSUMPTION | $I_{CC}$ | 2.0 | mA | VDCO1=VDCO2=5.0V<br>FB3=0V<br>CSWON=ENUP=5V<br>XLEDON=0V |
| [INPUT I/O UNIT: APPLIES TO ENUP, XLEDON, AND CSWON TERMINALS] | | | | |
| "H" LEVEL INPUT VOLTAGE | $V_{IOH}$ | 2.0 | V | |
| "L" LEVEL INPUT VOLTAGE | $V_{IOL}$ | 0.8 | V | |
| ENUP INPUT CURRENT 1 | $I_{ENUP1}$ | -5.0~5.0 | μA | ENUP=0V |
| ENUP INPUT CURRENT 2 | $I_{ENUP2}$ | 50 | μA | ENUP=5V |
| XLEDON INPUT CURRENT 1 | $I_{LED1}$ | -5.0~5.0 | μA | XLEDON=0V |
| XLEDON INPUT CURRENT 2 | $I_{LED2}$ | 50 | μA | XLEDON=5V |
| CSWON INPUT CURRENT 1 | $I_{CSW1}$ | -5.0~5.0 | μA | CSWON=0V |
| CSWON INPUT CURRENT 2 | $I_{CSW2}$ | 50 | μA | CSWON=5V |
| [STEP-DOWN DC/DC CONVERTER UNIT] | | | | |
| VDCO1 VOLTAGE | $V_{DCO1}$ | 1.200 | V | |
| VDCO2 VOLTAGE | $V_{DCO2}$ | 3.300 | V | |
| OSCILLATION FREQUENCY | $F_{OSCDW}$ | 3.0 | MHz | |
| DCSW1 HIGH SIDE SWITCH ON RESISTANCE | $R_{ONH1}$ | 0.38 | Ω | |
| DCSW1 LOW SIDE SWITCH ON RESISTANCE | $R_{ONL1}$ | 0.29 | Ω | |
| DCSW2 HIGH SIDE SWITCH ON RESISTANCE | $R_{ONH2}$ | 0.40 | Ω | |
| DCSW2 LOW SIDE SWITCH ON RESISTANCE | $R_{ONL2}$ | 0.30 | Ω | |
| SOFT START TIME | $T_{SOFTDW}$ | 1.0 | ms | NO LOAD, SET VOLTAGE × 0.85 |
| [STEP-UP DC/DC CONVERTER UNIT] | | | | |
| FB (VREF) VOLTAGE | $V_{FB3}$ | 0.600 | V | WHEN THERE IS NO LOAD |
| OSCILLATION FREQUENCY | $F_{OSCUP}$ | 1.50 | MHz | |
| HIGH SIDE SWITCH ON RESISTANCE | $R_{ONH3}$ | 0.65 | Ω | |
| LOW SIDE SWITCH ON RESISTANCE | $R_{ONL3}$ | 0.50 | Ω | |
| SOFT START STARTUP TIME | $T_{SOFTUP}$ | 11.0 | ms | WHEN THERE IS NO LOAD, SET VOLTAGE × 0.85 |
| MAXIMUM DUTY CYCLE | $D_{MAX}$ | 80 | % | |
| [RESET UNIT] | | | | |
| RESET ON VOLTAGE | $V_{RSTON1}$ | 3.700 | V | AVCC VOLTAGE MONITORED |
| | $V_{RSTON2}$ | 0.900 | V | VDCO1 VOLTAGE MONITORED |
| | $V_{RSTON3}$ | 2.700 | V | VDCO2 VOLTAGE MONITORED |
| RESET HYSTERESIS WIDTH | $V_{RSTHYS1}$ | 200 | mV | AVCC VOLTAGE MONITORED |
| | $V_{RSTHYS2}$ | 100 | mV | VDCO1 VOLTAGE MONITORED |
| | $V_{RSTHYS3}$ | 100 | mV | VDCO2 VOLTAGE MONITORED |
| RESET OUTPUT SINK VOLTAGE | $V_{RSINK}$ | 0.3 | V | ISINK=1.0mA |
| RESET OUTPUT LEAK CURRENT | $I_{RLK}$ | -5.0~5.0 | μA | XRESET=5.0V |
| RESET DELAY TIME | $T_{RST}$ | 50 | ms | |
| [CURRENT SWITCH UNIT] | | | | |
| CURRENT SWITCH ON RESISTANCE | $R_{CSWO}$ | 0.5 | Ω | CSWON=5V |
| [LED DRIVER UNIT] | | | | |
| LED DRIVER ON RESISTANCE | $R_{LEDO}$ | 5 | Ω | XLEDON=0V |

FIG.14

| TERMINAL NO. | TERMINAL NAME | EQUIVALENT CIRCUIT | FUNCTION |
|---|---|---|---|
| 1<br>10<br>20 | CSWON<br>ENUP<br>XLEDON | 10kΩ (typ.) — AVCC<br>100kΩ (typ.) — AGND | TTL LEVEL INPUT TERMINAL |
| 2<br>9<br>11 | DCSW1<br>DCSW2<br>DCSW3 | — PVCC (VDCO3)<br>*1 — PGND | POWER MOS DRIVER FOR SYNCHRONOUS RECTIFICATION OF DC/DC CONVERTER<br><br>*1 CLAMPING CIRCUIT FOR PROTECTING AGAINST ELECTROSTATIC DAMAGE |
| 16 | XRESET | — AVCC<br>— AGND | OPEN COLLECTOR OUTPUT |
| 3<br>8 | PVCC1<br>PVCC2 | AVCC<br>*1 — AGND<br>*1 — PGND | DIODE FOR PROTECTING POWER SUPPLY INPUT TERMINALS<br><br>*1 CLAMPING CIRCUIT FOR PROTECTING AGAINST ELECTROSTATIC DAMAGE |
| 13 | VDCO3 | — DCSW3<br>*1 — PGND<br>*1 | STEP-UP DC/DC CONVERTER OUTPUT<br><br>*1 CLAMPING CIRCUIT FOR PROTECTING AGAINST ELECTROSTATIC DAMAGE |

FIG.17

| OPERATING STATE | M1 | M2 | M3 | M4 | M5 |
|---|---|---|---|---|---|
| STANDBY STATE | OFF | OFF | OFF | ON | OFF |
| FIRST STARTUP STATE | OFF | OFF | OFF | ON | ON |
| SECOND STARTUP STATE | ON | OFF | ON | OFF | OFF |
| ACTIVE STATE | SW | SW | ON | OFF | OFF |
| OUTPUT GROUND STATE | OFF | OFF | OFF | ON | ON |

FIG.20

| OPERATING MODE | M1 | M2 | M3 | M4 | M5 | M6 | CONDITIONS |
|---|---|---|---|---|---|---|---|
| VCC OUTPUT MODE | ON | OFF | ON | OFF | OFF | OFF | ·AT THERMAL SHUTDOWN OPERATION<br>·AT OVERCURRENT DETECTION |
| INRUSH CURRENT SUPPRESSION MODE | OFF | OFF | OFF | ON | ON | OFF | ·AT STEPUP DC/DC OUTPUT STARTUP<br>·AT SHORT-CIRCUITING OF OUTPUT VOLTAGE |
| OUTPUT VOLTAGE DISCHARGE MODE | OFF | OFF | OFF | ON | OFF | ON | ·DURING UVLO OPERATION<br>·DURING OVER VOLTAGE MUTE OPERATION<br>·ENUP=LOW(STEP-UP DC/DC ENABLE OFF)<br>·DURING STEP-UP DC/DC TIMER LATCH OPERATION |

STEP-UP SWITCHING POWER SUPPLY DEVICE WITH CURRENT-LIMITING TRANSISTOR

CROSS-REFERENCE TO RELATED APPLICATIONS

This application is based on Japanese Patent Application No. 2009-133811 filed on Jun. 3, 2009, the contents of which are hereby incorporated by reference.

BACKGROUND OF THE INVENTION

1. Field of the Invention

The present invention relates to a step-up switching power supply device (chopper-type power supply device) for boosting an input voltage to generate an output voltage.

2. Description of Related Art

FIGS. 27A through 27C are circuit diagrams showing first through third prior art examples of step-up switching power supply devices. Japanese Laid-open Patent Publication No. 2006-304500 by the present applicant can be cited as an example of a conventional technique that relates to a step-up switching power supply device.

SUMMARY OF THE INVENTION

In the conventional step-up switching power supply devices described above, the input voltage Vin (power supply voltage VCC in FIGS. 27A through 27C) can be boosted to obtain a desired output voltage Vout by controlling the on/off state of an output transistor M2.

However, in the step-up switching power supply device shown in FIG. 27A, a current leak path is present that extends from the input terminal for the power supply voltage VCC to the output terminal for the output voltage Vout via a parasitic diode Dx that is attached to a synchronous rectifier transistor M1. Therefore, in a case in which the output voltage Vout is lower than the power supply voltage VCC due to the step-up operation being stopped, when the power supply voltage VCC is fed to the step-up switching power supply device, there is a risk of a large inrush current flowing into an output capacitor Cx through the current leak path described above even when the synchronous rectifier transistor M1 is off. At this time, when the power supply (e.g., battery) for feeding the power supply voltage VCC has low capability of feeding current, the inrush current described above causes the power supply voltage VCC to decrease, and other ICs or devices (not shown in FIGS. 27A through 27C) driven by the supply from the power supply voltage VCC can therefore be adversely affected. The same problem can occur in the step-up switching power supply device shown in FIG. 27B as well, because the synchronous rectifier diode Dy is in the conducting state when the output voltage Vout is lower than the power supply voltage VCC.

In the step-up switching power supply device shown in FIG. 27C, by switching the synchronous rectifier transistor M1 off as well as switching off a transistor M3 that is connected between the back gate and source of the synchronous rectifier transistor M1 when the step-up operation is stopped, the current leak path via the parasitic diode Dx can be blocked. Inrush currents and reduction of the power supply voltage VCC can therefore be prevented when the step-up operation is stopped. However, in a step-up switching power supply device of this configuration, since the output capacitor Cx is not charged at all even when the power supply voltage VCC is being fed while the step-up operation is stopped, the output voltage Vout is lower than the power supply voltage VCC at the time the synchronous rectifier transistor M1 is switched on during startup of the step-up operation, and a large inrush current flows into the output capacitor Cx. There is therefore a risk of the power supply voltage VCC decreasing, as described above.

In the step-up switching power supply devices shown in FIGS. 27A and 27C, an overcurrent flows into the synchronous rectifier transistor M1 when the output terminal is grounded (short-circuited to a ground terminal or a low-potential terminal based thereon) during step-up operation, and there is risk of damage to the synchronous rectifier transistor M1. The synchronous rectifier diode Dy can also be destroyed by grounding in the step-up switching power supply device shown in FIG. 27B as well.

In the step-up switching power supply device shown in FIG. 27C, since a charge remains in the output capacitor Cx when the step-up operation is stopped, there is risk of the output voltage Vout starting to rise from a potential higher than zero when step-up operation is subsequently resumed, potentially leading to abnormal operation under load.

In view of the abovementioned problems discovered by the present applicant, an object of the present invention is to provide a step-up switching power supply device capable of appropriately starting and stopping the step-up operation, and to provide a multi-output power supply device and electric apparatus in which the step-up switching power supply device is used.

In order to achieve the abovementioned objects, the step-up switching power supply device according to the present invention comprises a coil, one end of which is connected to an input terminal for an input voltage; an output transistor connected between the other end of the coil and a ground terminal; a synchronous rectifier transistor connected between the other end of the coil and an output terminal for an output voltage; an output capacitor connected between a ground terminal and the output terminal for the output voltage; a first back-gate control transistor connected between a back gate of the synchronous rectifier transistor and the output terminal for the output voltage; a discharge transistor connected between a ground terminal and the output terminal for the output voltage; and a control unit for controlling the on/off state of the output transistor, the synchronous rectifier transistor, the first back-gate control transistor, and the discharge transistor; wherein the control unit switches off the first back-gate control transistor and switches on the discharge transistor when stopping the switching operation of the output transistor and the synchronous rectifier transistor.

A step-up switching power supply device configured as described above enables the step-up operation to be appropriately started and stopped.

Other characteristics, aspects, steps, advantages, and properties of the present invention will become more apparent from the following detailed description of preferred embodiments and the attached drawings relating thereto.

BRIEF DESCRIPTION OF THE DRAWINGS

FIG. 2 is a table describing the functions of external terminals;

FIG. 4 is a table showing the electrical characteristics of the multi-output power supply device 1;

FIG. 14 is a chart showing the input/output equivalent circuits of each terminal;

FIG. 17 is a timing chart showing the startup operation of the step-up DC/DC converter 30;

FIG. 20 is a correlation chart showing the operating modes (operating states) of the step-up DC/DC converter 30 and the on/off states of the transistors M1 through M6;

DETAILED DESCRIPTION OF PREFERRED EMBODIMENTS

Figure 1:
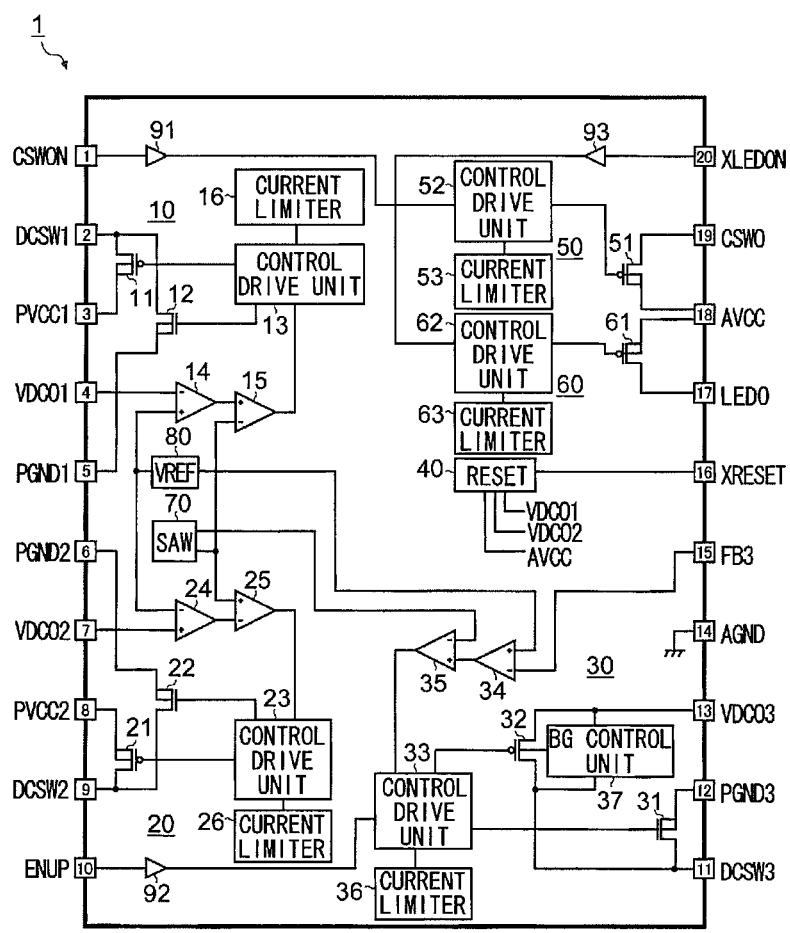
FIG. 1 is a block diagram showing an embodiment of the multi-output power supply device of the present invention.

FIG. 1 is a block diagram showing an embodiment of the multi-output power supply device according to the present invention. The multi-output power supply device 1 of the present embodiment is a multi-function power management IC in which components peripheral to the power supply of an optical disk device or a common consumer device are integrated on a single chip, and the multi-output power supply device 1 has two-channel step-down DC/DC converters 10 and 20, a one-channel step-up DC/DC converter 30, a reset circuit 40, a current switch 50, an LED (Light Emitting Diode) driver 60, a sawtooth wave generation circuit 70, a reference voltage generation circuit 80, and buffers 91 through 93. According to the multi-output power supply device 1 of the present embodiment, integrating the above-mentioned circuit elements on one chip contributes to reducing the amount of space occupied by the set power supply unit.

As shown in FIG. 1, the step-down DC/DC converter 10 is composed of a P-channel MOS (Metal Oxide Semiconductor) field-effect transistor 11 (output switch), an N-channel MOS field-effect transistor 12 (synchronous rectifier switch), a control drive unit 13, an error amplifier 14, a PWM (Pulse Width Modulation) comparator 15, and a current limiter 16.

The step-down DC/DC converter 20 is composed of a P-channel MOS field-effect transistor 21 (output switch), an N-channel MOS field-effect transistor 22 (synchronous rectifier switch), a control drive unit 23, an error amplifier 24, a PWM comparator 25, and a current limiter 26.

The step-up DC/DC converter 30 is composed of an N-channel MOS field-effect transistor 31 (output switch), a P-channel MOS field-effect transistor 32 (synchronous rectifier switch), a control drive unit 33, an error amplifier 34, a PWM comparator 35, a current limiter 36, and a back-gate control unit 37.

The current switch 50 is composed of a P-channel MOS field-effect transistor 51, a control drive unit 52, and a current limiter 53.

The LED driver 60 is composed of a P-channel MOS field-effect transistor 61, a control drive unit 62, and a current limiter 63.

The multi-output power supply device 1 has a plurality of external terminals (pins 1 through 28 and backside pad P) for establishing electrical connections with the outside of a device. FIG. 2 is a table showing the functions of the external terminals. Pin 1 (CSWON) is a current switch control terminal (on when CSWON=High). Pin 2 (DCSW1) is a switching terminal of the step-down DC/DC converter 10. Pin 3 (PVCC1) is a power supply input terminal for the step-down DC/DC converter 10. Pin 4 (VDCO1) is a feedback terminal of the step-down DC/DC converter 10. Pin 5 (PGND1) is a GND terminal for the step-down DC/DC converter 10. Pin 6 (PGND2) is a GND terminal for the step-down DC/DC converter 20. Pin 7 (VDCO2) is a feedback terminal of the step-down DC/DC converter 20. Pin 8 (PVCC2) is a power supply input terminal for the step-down DC/DC converter 20. Pin 9 (DCSW2) is a switching terminal of the step-down DC/DC converter 20. Pin 10 (ENUP) is an enable terminal (step-up DC/DC converter 30 is started by ENUP=High) of the step-up DC/DC converter 30. Pin 11 (DCSW3) is a switching terminal of the step-up DC/DC converter 30. Pin 12 (PGND3) is a GND terminal for the step-up DC/DC converter 30. Pin 13 (VDCO3) is an output terminal of the step-up DC/DC converter 30. Pin 14 (AGND) is a GND terminal of an analog unit. Pin 15 (FB3) is a feedback terminal of the step-up DC/DC converter 30. Pin 16 (XRESET) is a reset output terminal. Pin 17 (LEDO) is an output switching terminal of the LED driver 60. Pin 18 (AVCC) is a power supply terminal of the analog unit. Pin 19 (CSWO) is an output terminal of the current switch 50. Pin 20 (XLEDON) is for an LED driver control signal (on when XLEDON=High). The backside pad (GND) is a GND pad for heat dissipation.

The internal elements of the multi-output power supply device 1, circuit blocks, and interconnections with external terminals will be described in detail with reference to FIG. 1.

The source and back gate of the transistor 11 are connected to pin 3. The drain of the transistor 11 is connected to pin 2. The gate of the transistor 11 is connected to the control drive unit 13. The source and back gate of the transistor 12 are connected to pin 5. The drain of the transistor 12 is connected to pin 2. The gate of the transistor 12 is connected to the control drive unit 13. The inverting input terminal (−) of the error amplifier 14 is connected to pin 4. The non-inverting input terminal (+) of the error amplifier 14 is connected to the reference voltage generation circuit 80. The non-inverting input terminal (+) of the PWM comparator 15 is connected to the output terminal of the error amplifier 14. The inverting input terminal (−) of the PWM comparator 15 is connected to the output terminal of the sawtooth wave generation circuit 70. The output terminal of the PWM comparator 15 is connected to the control drive unit 13. The current limiter 16 is connected so as to detect the current flowing to the source of the transistor 11 and to transmit the detection result to the control drive unit 13.

The source and back gate of the transistor 21 are connected to pin 8. The drain of the transistor 21 is connected to pin 9. The gate of the transistor 21 is connected to the control drive unit 23. The source and back gate of the transistor 22 are connected to pin 6. The drain of the transistor 22 is connected to pin 9. The gate of the transistor 22 is connected to the control drive unit 23. The non-inverting input terminal (+) of the error amplifier 24 is connected to pin 7. The inverting input terminal (−) of the error amplifier 24 is connected to the reference voltage generation circuit 80. The inverting input terminal (−) of the PWM comparator 25 is connected to the output terminal of the error amplifier 24. The non-inverting input terminal (+) of the PWM comparator 25 is connected to the inverting output terminal of the sawtooth wave generation circuit 70. The output terminal of the PWM comparator 25 is connected to the control drive unit 23. The current limiter 26 is connected so as to detect the current flowing to the source of the transistor 21 and to transmit the detection result to the control drive unit 23.

The source and back gate of the transistor 31 are connected to pin 12. The drain of the transistor 31 is connected to pin 11. The gate of the transistor 31 is connected to the control drive unit 33. The source of the transistor 32 is connected to pin 13. The drain of the transistor 32 is connected to pin 11. The gate of the transistor 32 is connected to the control drive unit 33. The back gate of the transistor 32 is connected to the back-gate control unit 37. The inverting input terminal (−) of the error amplifier 34 is connected to pin 15. The non-inverting input terminal (+) of the error amplifier 34 is connected to the reference voltage generation circuit 80. The non-inverting input terminal (+) of the PWM comparator 35 is connected to the output terminal of the error amplifier 34. The inverting input terminal (−) of the PWM comparator 35 is connected to the output terminal of the sawtooth wave generation circuit 70. The output terminal of the PWM comparator 35 is connected to the control drive unit 33. The current limiter 36 is connected so as to detect the current flowing to the source of the transistor 31 and to transmit the detection result to the control drive unit 33. The back-gate control unit 37 is connected between pin 11 and pin 13.

The source and back gate of the transistor 51 is connected to pin 18. The drain of the transistor 51 is connected to pin 19. The gate of the transistor 51 is connected to the control drive unit 52. The current limiter 53 is connected so as to detect the current flowing to the source of the transistor 51 and to transmit the detection result to the control drive unit 52.

The source and back gate of the transistor 61 are connected to pin 18. The drain of the transistor 61 is connected to pin 17. The gate of the transistor 61 is connected to the control drive unit 62. The current limiter 63 is connected so as to detect the current flowing to the source of the transistor 61 and to transmit the detection result to the control drive unit 62.

Pin 1 is connected to the control drive unit 52 via the buffer 91. Pin 10 is connected to the control drive unit 33 via the buffer 92. Pin 14 is connected to a GND line of the analog unit. Pin 16 is connected to the reset circuit 40. Pin 20 is connected to the control drive unit 62 via the buffer 93.

Figure 3:
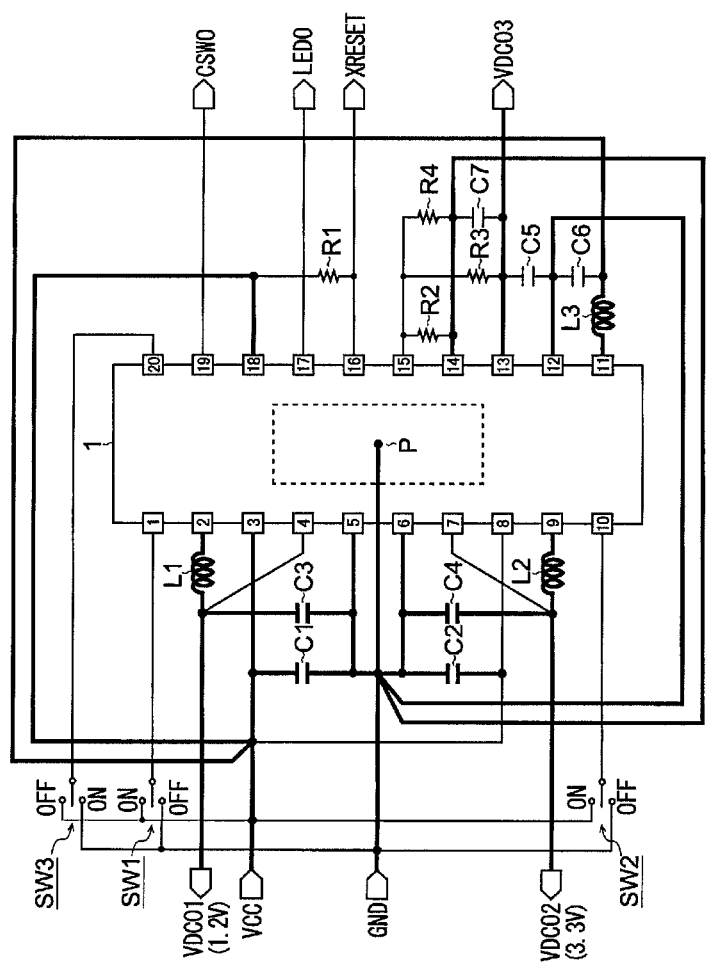
FIG. 3 is a system configuration view showing an example of the elements connected to the multi-output power supply device 1.

FIG. 3 is a system configuration view showing an example of the elements externally connected to the multi-output power supply device 1. As shown in FIG. 3, coils L1 through L3, capacitors C1 through C7, resistors R1 through R4, and switches SW1 through SW3 are connected to the outside of the multi-output power supply device 1 to form a system.

One end of the coil L1 is connected to pin 2. The other end of the coil L1 is connected to pin 4 and to the output terminal for the output voltage VDCO1. One end of the coil L2 is connected to pin 9. The other end of the coil L2 is connected to pin 7 and to the output terminal for the output voltage VDCO2. One end of the coil L3 is connected to pin 11. The other end of the coil L3 is connected to the application terminal for the power supply voltage VCC.

One end of the capacitor C1 is connected to pin 3. The other end of the capacitor C1 is connected to the ground terminal. One end of the capacitor C2 is connected to pin 8. The other end of the capacitor C2 is connected to the ground terminal. One end of the capacitor C3 is connected to the other end of the coil L1. The other end of the capacitor C3 is connected to the ground terminal. One end of the capacitor C4 is connected to the other end of the coil L2. The other end of the capacitor C4 is connected to the ground terminal. One end of the capacitor C5 is connected to pin 13. The other end of the capacitor C5 is connected to pin 12. One end of the capacitor C6 is connected to pin 12. The other end of the capacitor C6 is connected to the other end of the coil L3. One end of the capacitor C7 is connected to pin 14. The other end of the capacitor C7 is connected to pin 13.

One end of the resistor R1 is connected to pin 18. The other end of the resistor R1 is connected to pin 16. One end of the resistor R2 is connected to pin 15. The other end of the resistor R2 is connected to pin 14. One end of the resistor R3 is connected to pin 15. The other end of the resistor R3 is connected to pin 13. One end of the resistor R4 is connected to pin 15. The other end of the resistor R4 is connected to pin 14.

A common terminal of the switch SW1 is connected to pin 1. A first selection terminal (ON selection terminal) of the switch SW1 is connected to the application terminal for the power supply voltage VCC. A second selection terminal (OFF selection terminal) of the switch SW1 is connected to the ground terminal. A common terminal of the switch SW2 is connected to pin 10. A first selection terminal (ON selection terminal) of the switch SW2 is connected to the application terminal for the power supply voltage VCC. A second selection terminal (OFF selection terminal) of the switch SW2 is connected to the ground terminal. A common terminal of the switch SW3 is connected to pin 20. A first selection terminal (OFF selection terminal) of the switch SW3 is connected to the application terminal for the power supply voltage VCC. A second selection terminal (ON selection terminal) of the switch SW3 is connected to the ground terminal.

Pin 1 is connected to the common terminal of the switch SW1. Pin 2 is connected to one end of the coil L1. Pin 3 is connected to the application terminal for the power supply voltage VCC. Pin 4 is connected to the output terminal for the output voltage VDCO1. Pin 5 and pin 6 are both connected to the ground terminal. Pin 7 is connected to the output terminal for the output voltage VDCO2. (*1) Pin 8 is connected to the application terminal for the power supply voltage VCC. Pin 9 is connected to one end of the coil L2. Pin 10 is connected to the common terminal of the switch SW2. Pin 11 is connected to one end of the coil L3. Pin 12 is connected to the ground terminal. Pin 13 is connected to the output terminal for the output voltage VDCO3. Pin 14 is connected to the ground terminal. Pin 15 is connected to one end of each of the resistors R2 through R4. Pin 16 is connected to the output terminal for the reset signal XRESET. Pin 17 is connected to the output terminal for the LED driver output LEDO. Pin 18 is connected to the application terminal for the power supply voltage VCC. Pin 19 is connected to the output terminal for the current switch output CSW. Pin 20 is connected to the common terminal of the switch SW3. The backside pad P is connected to the ground terminal.

Pins 3, 8, and 18 should always be connected to the power supply on the substrate. The wiring connected to pins 3, 8, and 18 is preferably laid out so as to be thick and short, and designed so that impedance is sufficiently low. Pins 5, 6, 12, and 14 should always be connected to the GND on the substrate. The wiring connected to pins 5, 6, 12, and 14 is preferably laid out so as to be thick and short, and designed so that impedance is sufficiently low. The output voltage VDCO1 is preferably brought out from both ends of the output-side capacitor C3. The output voltage VDCO2 is preferably brought out from both ends of the output-side capacitor C4. The output voltage VDCO3 is preferably brought out from both ends of the output-side capacitor C5. Since the performance of each of the step-down DC/DC converter 10, the step-down DC/DC converter 20, and the step-up DC/DC converter 30 is affected by the substrate pattern or the peripheral components, it is pr adequately study the design of the peripheral circuits. Ceramic capacitors having low ESR (Equivalent Series Resistance) are used as the bypass capacitor C1 connected between pin 3 and pin 5, the bypass capacitor C2 connected between pin 8 and pin 6, and the capacitor C6 connected between pin 12 and the step-up coil L3, and these capacitors are preferably positioned as near as possible to the multi-output power supply device 1. The wiring connected to pin 14 is preferably independent from the GND side of the capacitors C1, C2 on the input side. Components outside the coils L1 through L3, the capacitors C1 through C7, or other components are preferably positioned as near as possible to the multi-output power supply device 1. Thick, short wiring is preferred particularly for wiring that is connected to components to which large amounts of current flow.

The switches SW1 through SW3 described above are not necessarily prepared as discrete components, and control signals as logical switches may also be inputted to each pin from a logic circuit.

A first characteristic feature of the multi-output power supply device 1 configured as described above is that the multi-output power supply device 1 is equipped with a synchronous rectifier-type step-down DC/DC converter 10 that is capable of a 1.2 V fixed output. A second characteristic feature is that the multi-output power supply device 1 is equipped with a synchronous rectifier-type step-down DC/DC converter 20 that is capable of a 3.3 V fixed output. A third characteristic feature is that the multi-output power supply device 1 is equipped with a synchronous rectifier-type step-up DC/DC converter 30. A fourth characteristic feature is that the multi-output power supply device 1 is equipped with an output current limiter and a short circuit protection function. A fifth characteristic feature is that the multi-output power supply device 1 is equipped with a phase compensation circuit for the error amplifiers 14, 24 included in the step-down DC/DC converters 10 and 20, respectively. A sixth characteristic feature is that the step-down DC/DC converter 10, the step-down DC/DC converter 20, and the step-up DC/DC converter 30 are each subjected to high-speed switching control (step-down DC/DC operating frequency: 3.0 MHz (typ.), step-up DC/DC operating frequency: 1.5 MHz (typ.)), and that small-sized inexpensive coils are used. A seventh characteristic feature is that the multi-output power supply device 1 is equipped with a reset circuit 40, a current switch 50, and an LED driver 60. An eighth characteristic feature is that the multi-output power supply device 1 is equipped with a shutdown function for the step-up DC/DC converter 30.

FIG. 4 is a table showing the electrical characteristics of the multi-output power supply device 1. Unless otherwise indicated, PVCC1=PVCC2=AVCC=5.0 V, and Ta=25° C.

The operation of each block forming the multi-output power supply device 1 will next be briefly described.

The step-down DC/DC converter 10 and the step-down DC/DC converter 20 are each two-channel synchronous rectifier-type step-down DC/DC converters that house an output-level power MOS transistor. When the power supply is activated, operation is initiated at a UVLO release voltage (3.7 V (typ.)), and the output voltages VDCO1, VDCO2 are gradually raised by a soft start circuit (not shown in FIG. 1; soft start period: 1.0 ms (typ.)) built into the multi-output power supply device 1. The output voltage VDCO1 is fixed at 1.2 V, and the output voltage VDCO2 is fixed at 3.3 V. The step-down DC/DC converter 10 and the step-down DC/DC converter 20 stop switching at the time of shutdown. At this time, pin 2 (DCSW1), pin 4 (VDCO1), pin 7 (VDCO2), and pin 9 (DCSW2) are discharged by built-in resistors. As shown in FIG. 3, predetermined external components (coils, output capacitors, bypass capacitors) are necessary to the step-down DC/DC converter 10 and the step-down DC/DC converter 20.

The step-up DC/DC converter 30 is a synchronous rectifier-type step-up DC/DC converter that is equipped with an output-level power MOS transistor. In a case in which pin 10 (ENUP) is fixed at the high level, the step-up DC/DC converter 30 enables a built-in inrush current suppression function at the time a reset release operation is established, i.e., at the time pin 16 (XRESET) is switched from low level to high level, and gradually increases the output voltage VDCO3 to a level near the potential of the power supply voltage VCC. The step-up DC/DC converter 30 then gradually raises the output voltage VDCO3 to the set value for the output voltage through the use of the soft start circuit built into the multi-output power supply device 1. In the reset release state (the state in which pin 16 (XRESET) is high-level), the startup operation of the step-up DC/DC converter 30 is the same as described above when ON/OFF control using pin 10 (ENUP) is performed. Since the inrush current suppressing function has maximum effectiveness when the load current during startup is zero, a state of minimal output current is preferred during startup. An internal setting is adopted so that the duty of the PWM signal used by the step-up DC/DC converter 30 is limited to 80% (typ.). During shutdown in the step-up DC/DC converter 30, the load from the output terminal of the step-up DC/DC converter 30 is completely blocked by a back-gate control function, and pin 13 (VDCO3) is discharged by a built-in resistor. Predetermined external components (coils, output capacitors, bypass capacitors) are necessary to the step-up DC/DC converter 30, as shown in FIG. 3.

Since the reset circuit 40 is in the form of an open collector output, a pull-up resistor R1 must be connected to pin 16, which is the output terminal for the reset signal XRESET, as shown in FIG. 3. The value of the pull-up resistor R1 is preferably set to a resistance value (not exceeding 1 mA) at which the maximum current (sink current) flowing into the output transistor of the reset circuit 40 is not excessive when the output transistor of the reset circuit 40 is in the ON state. The reset circuit 40 switches on the output transistor thereof and sets the reset signal XRESET to low-level when any of the following conditions occur: the power supply voltage VCC is equal to or lower than the set detection voltage (3.7 V (typ.)), the output voltage VDCO1 of the step-down DC/DC converter 10 or the output voltage VDCO2 of the step-down DC/DC converter 20 is equal to or lower than the set detection voltage, and a command for shutdown has been issued. On the other hand, beginning at the time that all the conditions are established that include startup detection of the power supply voltage VCC, startup detection of the step-down DC/DC converter 10 and step-down DC/DC converter 20, and release detection of the shutdown mode, the reset circuit 40 in the reset release operation initiates counting by a timer circuit (not shown in FIG. 1) built into the multi-output power supply device 1, and after 50 ms (typ.) have elapsed, the reset circuit 40 switches off the output transistor thereof to release the reset state and sets the reset signal XRESET to the high level.

When pin 1 (CSWON) is at the high level, the current switch 50 switches on a built-in switch element (PMOS transistor 51). When pin 1 (CSWON) is at the low level, the current switch 50 switches off the built-in switch element (PMOS transistor 51) and performs a discharge via a built-in resistor. The current switch 50 is used in a state in which the power supply voltage VCC is connected to the pin 18 (AVCC) side, and the load is connected to the pin 19 (CSWO) side.

When pin 20 (XLEDON) is at the low level, the LED driver 60 switches on a built-in switch element (PMOS transistor 61). When pin 20 (XLEDON) is at the high level, the LED driver 60 switches off the built-in switch element (PMOS transistor 61) and performs a discharge via a built-in resistor. The LED driver 60 is used in a state in which the power supply voltage VCC is connected to the pin 18 (AVCC), and the load (LED) is connected to the pin 17 (LEDO).

The multi-output power supply device 1 is equipped with an overcurrent/short-circuit protection function for protecting the IC from overcurrent or from output short circuiting (ground shorting), a thermal shutdown function for preventing thermal breakdown of the IC, an overvoltage mute function for preventing malfunction of the IC due to overvoltage, a UVLO function for preventing malfunction of the IC due to undervoltage, a shutdown function for forcibly stopping the output operation of the DC/DC converters, and a voltage short breakdown prevention function for preventing breakdown of the IC due to power supply voltage shorting.

For the overcurrent/short-circuit protection function, the multi-output power supply device 1 is equipped with an overcurrent protection circuit (current limiter 36) for the current that flows to the NMOS transistor 31 of the step-up DC/DC converter 30. The multi-output power supply device 1 is also equipped with a short-circuit protection circuit (not shown in FIG. 1) for detecting an output short circuit of the step-up DC/DC converter 30. The multi-output power supply device 1 is also equipped with overcurrent protection circuits (current limiters 16, 26, 53, 63) for the current that flows to the PMOS transistor 11 of the step-down DC/DC converter 10, the current that flows to the PMOS 21 of the step-down DC/DC converter 20, the current that flows to the PMOS transistor 51 of the current switch 50, and the current that flows to the PMOS transistor 61 of the LED driver 60. The multi-output power supply device 1 is also equipped with a short-circuit protection circuit (not shown in FIG. 1) for detecting output short-circuiting of the step-down DC/DC converter 10, the step-down DC/DC converter 20, the current switch 50, and the LED driver 60.

For the UVLO function, a shutdown function is active in the multi-output power supply device 1 for preventing malfunction of the IC due to undervoltage in a case in which the power supply voltage VCC is 3.6 V (typ.) or lower (3.70 V (typ.) or lower in the LED driver 60). When the power supply voltage VCC returns to 3.7 V (typ.) or higher (3.90 V (typ.) or higher in the LED driver 60), the multi-output power supply device 1 cancels the shutdown function and restarts.

For the shutdown function, the multi-output power supply device 1 can control shutdown of the step-up DC/DC converter 30 by pin 10 (ENUP). In a case in which pin 10 (ENUP) is at the low level, components other than the step-up DC/DC converter 30 are shut down. The shutdown interval (interval during which pin 10 (ENUP) is low-level) is preferably set to 100 μs in the case where shutdown is controlled as described above using pin 10 (ENUP).

For the voltage short breakdown prevention function, the multi-output power supply device 1 discharges the output of the step-down DC/DC converters 10 and 20 via a built-in resistor when the output (VDCO1, VDCO2) of the step-down DC/DC converters 10 and 20 is 3.6 V (typ.) or higher.

Figure 5:
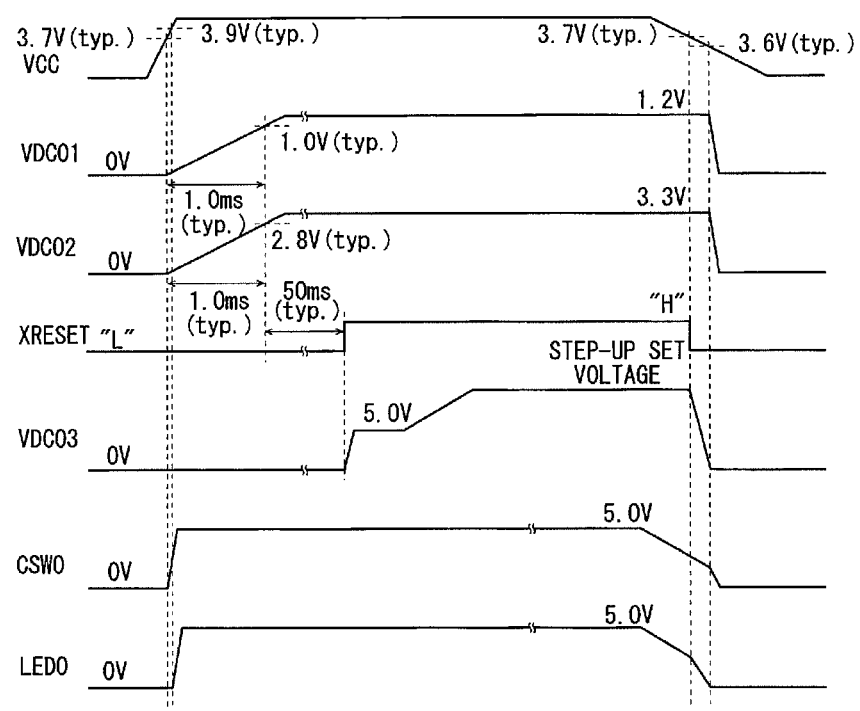
FIG. 5 is a timing chart showing the startup waveform of each output voltage.

The startup operation of the multi-output power supply device 1 will next be described in detail with reference to FIG. 5. FIG. 5 is a timing chart showing the startup waveform of each output voltage. In the case of startup by the VCC (ENUP=High, XLEDON=Low, CSWON=High), the step-down DC/DC converters 10 and 20, the current switch 50, and the LED driver 60 initiate startup when the VCC has reached the UVLO release voltage (3.7 V (typ.)). The step-up DC/DC converter 30 then initiates startup 50 ms (typ.) later at the reset release time (time at which the reset signal XRESET switches from low-level to high-level). When the VCC voltage decreases or the output of the step-down DC/DC converters 10, 20 decreases for any reason, and a reset due to shutdown operation is detected (the reset signal XRESET switches from high-level to low-level), the step-up DC/DC converter 30 is forcibly transitioned to the shutdown operation.

Figure 6:
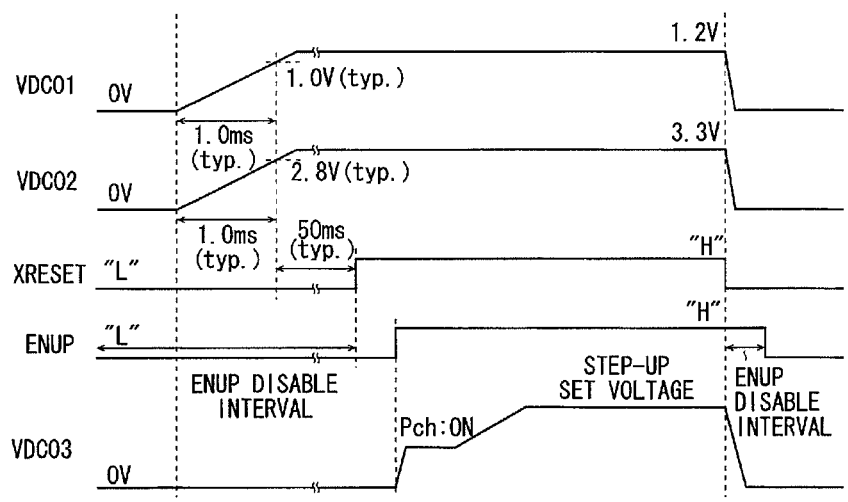
FIG. 6 is a timing chart showing the control of the step-up DC/DC converter by pin 10 (ENUP)

Control of the step-up DC/DC converter by pin 10 (ENUP) will next be described in detail with reference to FIG. 6. FIG. 6 is a timing chart showing the control of the step-up DC/DC converter by the pin 10 (ENUP). In a case in which the step-up DC/DC converter 30 is controlled using pin 10 (ENUP), during the interval in which the reset signal XRESET is maintained at the low level, control using pin 10 (ENUP) is disabled, and the step-up DC/DC converter 30 is maintained in a state of forced shutdown. Specifically, pin 10 (ENUP) is used when the step-up DC/DC converter 30 is to be controlled at an arbitrary timing after the reset signal XRESET has risen from low-level to high-level and the reset state is released.

Figure 7:
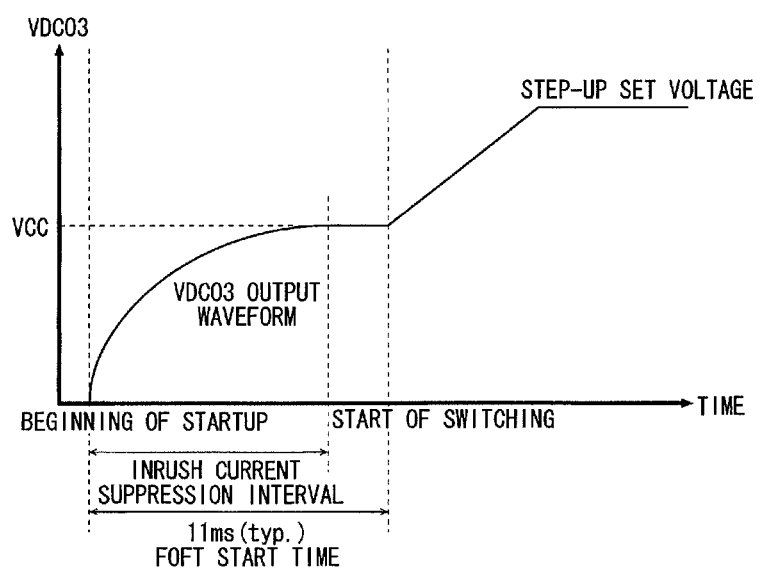
FIG. 7 is a timing chart showing the inrush current suppression function of the step-up DC/DC converter 30.

The inrush current suppression function of the step-up DC/DC converter 30 will next be described with reference to FIG. 7. FIG. 7 is a timing chart showing the inrush current suppression function of the step-up DC/DC converter 30. During startup in the step-up DC/DC converter 30, the operation whereby the output voltage VDCO3 rises to a level near the power supply voltage VCC always occurs by the time switching is initiated, and a charging current (inrush current) to the output capacitor C5 is generated by this process. In the multi-output power supply device 1 of the present embodiment, the built-in inrush current suppression function is activated at startup of the step-up DC/DC converter 30, and the inrush current is suppressed by gradually increasing the output voltage VDCO3, as shown in FIG. 7. According to the inrush current suppression function, in case the output voltage VDCO3 does not reach 1.5 V (typ.) or higher due to an output ground fault or other fault when the output voltage VDCO3 is being raised, the soft start function does not operate, and inrush current suppression is continued. After the inrush current suppression function is released, the output voltage VDCO3 is gradually raised to a voltage value determined by a set resistance ratio by the soft start circuit built into the multi-output power supply device 1. Since the inrush current suppression function is most effective when the load current is zero during startup, minimal output current is preferably maintained during startup.

Figure 8:
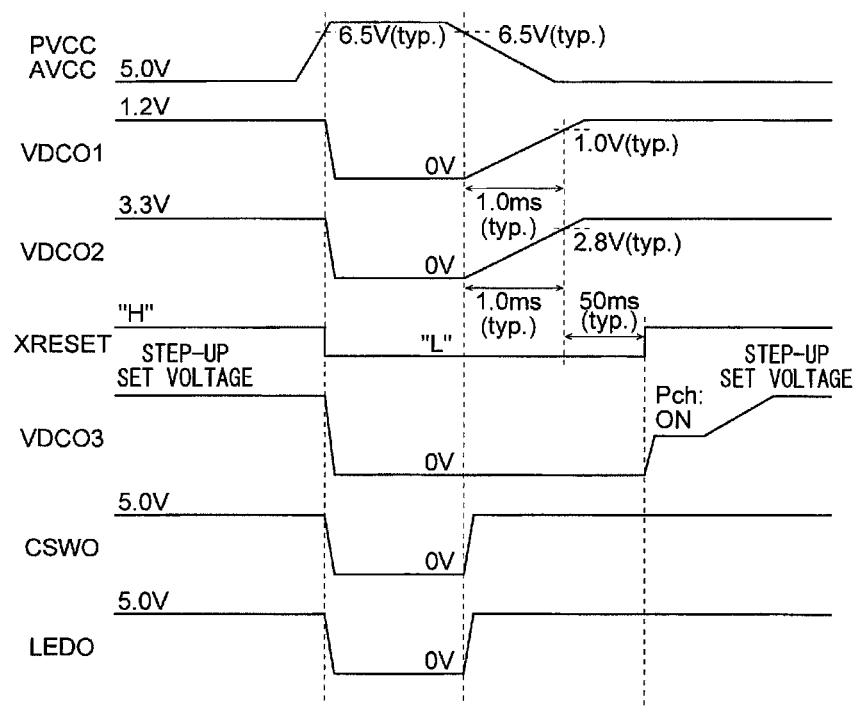
FIG. 8 is a timing chart showing the waveform of the overvoltage mute function during operation.

The overvoltage mute function and the UVLO function will next be described in detail with reference to FIG. 8. FIG. 8 is a timing chart showing the waveform of the overvoltage mute function during operation. FIG. 8 shows a case in which ENUP=CSWON=High, and XLEDON=Low. In a case in which the VCC reaches 6.5 V (typ.) and the overvoltage mute function is active, the output of the step-up DC/DC converter 30, the output of the step-down DC/DC converters 10, 20, the output of the current switch 50, and the output of the LED driver 60 are all shut down, and the outputs are discharged by the resistors built into the multi-output power supply device 1. The same operation as that of the overvoltage mute function occurs when the UVLO function is active.

Figure 9A:
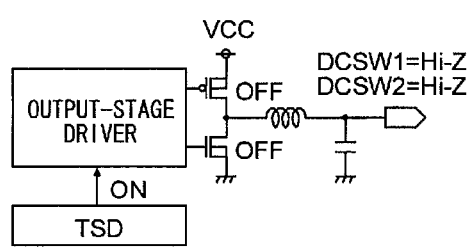
FIG. 9A is a block diagram showing the output states of the step-down DC/DC converters 10 and 20 during thermal shutdown.
Figure 9B:
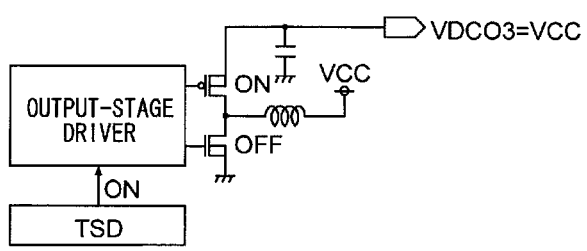
FIG. 9B is a block diagram showing the output state of the step-up DC/DC converter 30 during thermal shutdown.

The thermal shutdown function will next be described with reference to FIGS. 9A and 9B. FIG. 9A is a block diagram showing the output states of the step-down DC/DC converters 10, 20 at the time of thermal shutdown, and FIG. 9B is a block diagram showing the output state of the step-up DC/DC converter 30 at the time of thermal shutdown. As shown in FIG. 9A, at the time of the thermal shutdown operation, the DCSW1 and DCSW2 of the step-down DC/DC converters 10, 20 are each in a high-impedance state. As shown in FIG. 9B, at the time of the thermal shutdown operation, among the power transistors that form the step-up DC/DC converter 30, the PMOS transistor 32 is on, and the NMOS transistor 31 is off. The current switch output CSWO and the LED driver output LEDO both have 0 V outputs.

Figure 10:
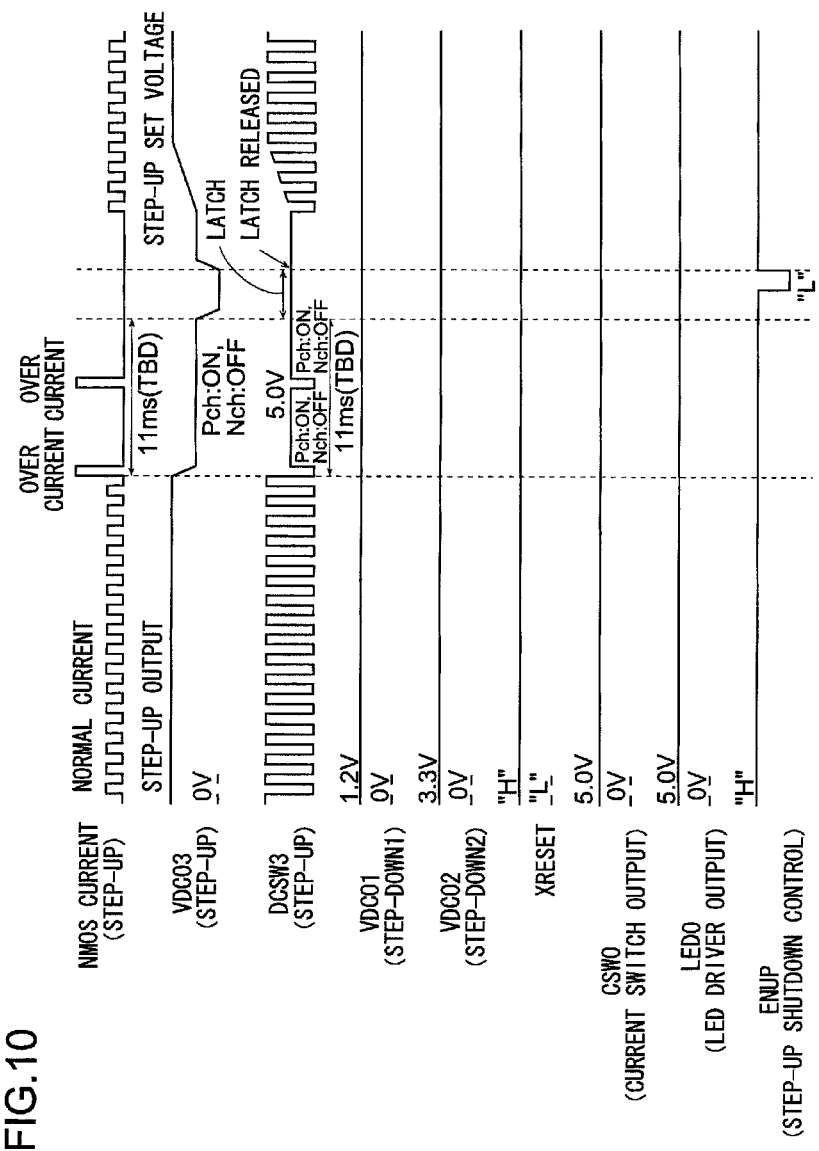
FIG. 10 is a timing chart showing the overcurrent detection operation of the step-up DC/DC converter 30.

The overcurrent protection function of the step-up DC/DC converter 30 will next be described in detail with reference to FIG. 10. FIG. 10 is a timing chart showing the overcurrent detection operation of the step-up DC/DC converter 30. The step-up DC/DC converter 30 is equipped with an overcurrent protection function that operates in cases in which an overcurrent flows to the load. Actually, in the step-up DC/DC converter 30, the current flowing to the NMOS transistor 31 is monitored, and when an overcurrent is detected, the NMOS transistor 31 is switched off, and the soft start function is reactivated to return to normal operation. When an overcurrent is detected a second time within a predetermined period of time from detection of the first overcurrent, the PMOS transistor 32 is latched in the ON state and the NMOS transistor 31 is latched in the OFF state once the predetermined period has elapsed from the first overcurrent detection. Output operation of the step-down DC/DC converters 10, 20, output operation of the current switch 50, output operation of the LED driver 60, and output operation of the reset circuit 40 are each continued regardless of the overcurrent detection operation of the step-up DC/DC converter 30. The latch state is released by turning the power supply back on or by shutdown at the ENUP terminal, and the step-up DC/DC converter 30 is restored.

Figure 11:
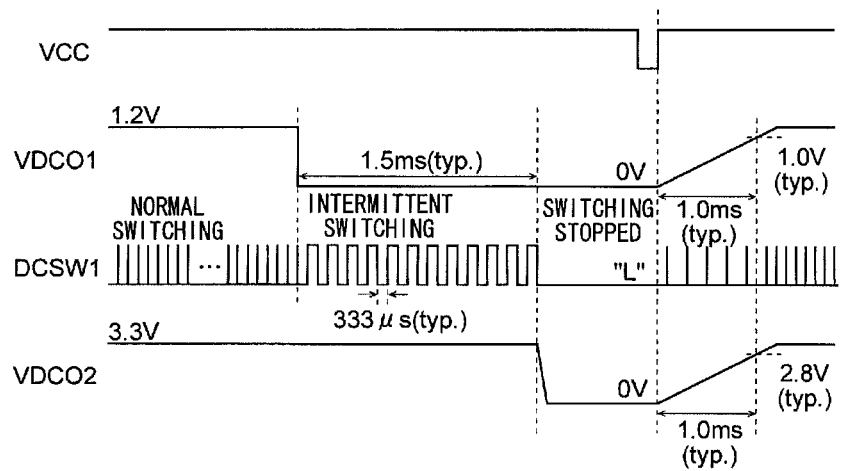
FIG. 11 is a timing chart showing the overcurrent detection operation of the step-down DC/DC converters 10, 20 (in the case of VDCO1 overcurrent detection)

The overcurrent protection function of the step-down DC/DC converters 10, 20 will next be described in detail with reference to FIG. 11. FIG. 11 is a timing chart showing the overcurrent detection operation of the step-down DC/DC converters 10, 20 (in the case of VDCO1 overcurrent detection). When an overcurrent is detected, charging from the PVCC to the output capacitor C3 is prohibited. When the overcurrent detection state (which includes a ground fault detection state) continues for a period of 1.5 ms (typ.), the short-circuit protection circuit activates to enact a latch, and the output of the step-down DC/DC converters 10, 20 stops switching (DCSW1=0 V, DCSW2=0 V). The current switch output and LED driver output continue to operate regardless of the overcurrent detection operation of the step-down DC/DC converters 10, 20. On the other hand, the step-up DC/DC converter 30 transitions to the shutdown operation by detecting a reset due to a reduction in the output of the step-down DC/DC converters 10, 20. By reactivating the power supply, the abovementioned latch state is released, and the step-down DC/DC converters 10, 20 are restored.

Figure 12:
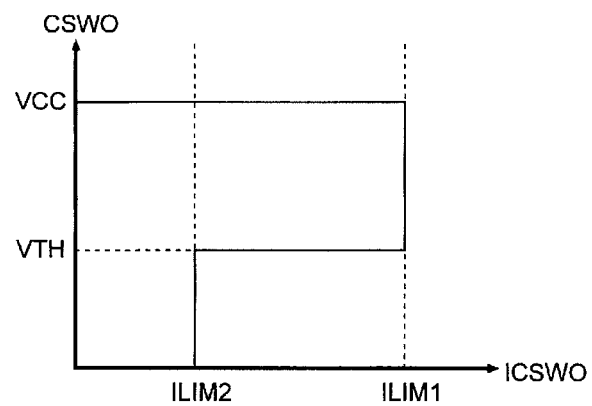
FIG. 12 is a view showing an example of the overcurrent detection characteristics of the current switch 50.
Figure 13:
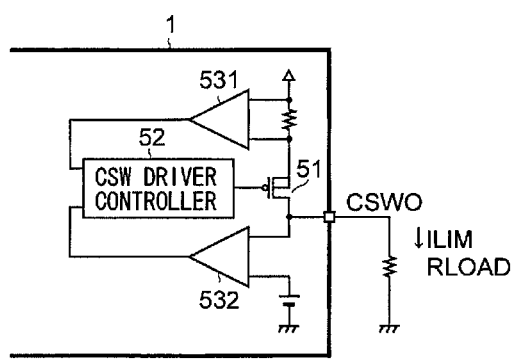
FIG. 13 is a block diagram showing an example of the structure of the current limiter 53.

The overcurrent protection function of the current switch 50 and the LED driver 60 will next be described in detail with reference to FIGS. 12 and 13. FIG. 12 is a view showing an example of the overcurrent detection characteristics of the current switch 50. FIG. 13 is a block diagram showing an example of the structure of the current limiter 53. Since the overcurrent protection function of the LED driver 60 is the same as the overcurrent protection function of the current switch 50, only the overcurrent protection function of the current switch 50 will be described, and no redundant description of the overcurrent protection function of the LED driver 60 will be given. As shown in FIG. 13, the current limiter 53 is composed of an overcurrent detection comparator 531 and an output voltage detection comparator 532. In a case in which an overcurrent occurs at the CSWO terminal, the overcurrent detection comparator 531 inside the multi-output power supply device 1 activates, and the amount of current flowing to output is limited to ILIM1. When the output voltage of the CSWO terminal is equal to or lower than the threshold value VTH of the output voltage detection comparator 532, the limit current value is furthermore limited to ILIM2. The step-up DC/DC converter 30 and the step-down DC/DC converters 10, 20 each continue to operate regardless of the operation of this overcurrent protection circuit.

FIG. 14 is a chart showing the input/output equivalent circuits of each terminal.

The structure and operation of the step-up DC/DC converter 30 will next be described in further detail.

Figure 15:
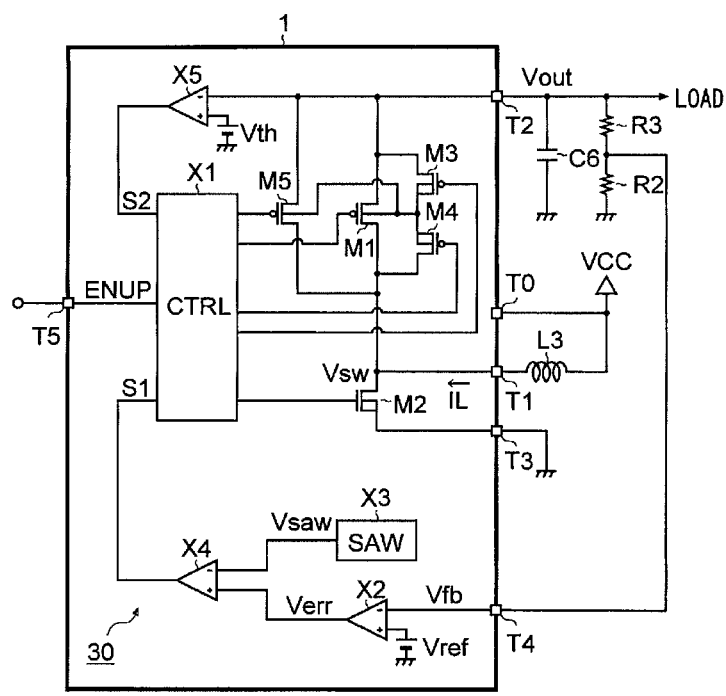
FIG. 15 is a circuit block diagram showing a first example of the structure of the step-up DC/DC converter 30.

FIG. 15 is a circuit block diagram showing a first example of the structure of the step-up DC/DC converter 30. As shown in FIG. 15, the step-up DC/DC converter 30 of the present example is composed of a control unit X1 (corresponding to the control drive unit 33), an error amplifier X2 (corresponding to the error amplifier 34), an oscillator X3 (corresponding to the sawtooth wave generation circuit 70), a PWM (Pulse Width Modulation) comparator X4 (corresponding to the PWM comparator 35), a ground fault detector X5, a synchronous rectifier transistor M1 (corresponding to the PMOS transistor 32), an output transistor M2 (corresponding to the NMOS transistor 31), back-gate control transistors M3 and M4 (corresponding to the back-gate control unit 37), and a current-limiting transistor M5.

The synchronous rectifier transistor M1 is a P-channel MOS (Metal Oxide Semiconductor) field-effect transistor, and the drain thereof is connected to an external terminal T1 (switch terminal; corresponds to pin 11). The source of the transistor M1 is connected to an external terminal T2 (output terminal; corresponds to pin 13). The gate of the transistor M1 is connected to a first gate signal output terminal of the control unit X1. Although this is not shown in FIG. 15, a parasitic diode is attached the transistor M1, wherein the anode is connected to the drain between the drain and back gate of the transistor, and the cathode is connected to the back gate of the transistor.

The transistor M2 is an N-channel MOS field-effect transistor, and the drain thereof is connected to the external terminal T1. The source and back gate of the transistor M2 are connected to an external terminal T3 (ground terminal; corresponds to pin 12). The gate of the transistor M2 is connected to a second gate signal output terminal of the control unit X1.

The transistor M3 is a P-channel MOS field-effect transistor, and the drain thereof is connected to the external terminal T2. The source and back gate of the transistor M3 are connected to the back gate of the transistor M1. The gate of the transistor M3 is connected to a third gate signal output terminal of the control unit X1.

The transistor M4 is a P-channel MOS field-effect transistor, and the drain thereof is connected to the external terminal T1. The source and back gate of the transistor M4 are connected to the back gate of the transistor M1. The gate of the transistor M4 is connected to a fourth gate signal output terminal of the control unit X1. The drain of the transistor M4 may also be connected to an external terminal T0 (power supply terminal; corresponds to pin 3 or pin 8).

The transistor M5 is a P-channel MOS field-effect transistor having a larger on-resistance value than the transistor M1, and the drain of the transistor M5 is connected to the external terminal T1. The source of the transistor M5 is connected to the external terminal T2. The gate of the transistor M5 is connected to a fifth gate signal output terminal of the control unit X1. The back gate of the transistor M5 is connected to the back gate of the transistor M1. The drain of the transistor M5 may also be connected to the external terminal T0.

The inverting input terminal (−) of the error amplifier X2 is connected to an external terminal T4 (feedback terminal; corresponds to pin 15). The non-inverting input terminal (+) of the error amplifier X2 is connected to a reference voltage Vref application terminal. The non-inverting input terminal (+) of the PWM comparator X4 is connected to the output terminal of the error amplifier X2. The inverting input terminal (−) of the PWM comparator X4 is connected to the output terminal of the oscillator X3. The output terminal of the PWM comparator X4 is connected to the PWM signal input terminal of the control unit X1.

The ground fault detector X5 is a means for detecting whether the external terminal T2 is ground faulted (short-circuited to the ground terminal or to a low-potential terminal based on the ground terminal). In the first example of the structure shown in FIG. 15, a comparator is used as the ground fault detector X5 in which the inverting input terminal (−) is connected to the external terminal T2, the non-inverting input terminal (+) is connected to a threshold voltage Vth application terminal, and the output terminal is connected to a ground fault detection signal input terminal of the control unit X1.

Outside the multi-output power supply device 1, the external terminal T0 and one end of the coil L3 are each connected to the input terminal for an input voltage Vin (power supply voltage VCC in FIG. 15). The power supply voltage VCC presented to the external terminal T0 is used to drive the circuit blocks (in FIG. 15, the control unit X1, error amplifier X2, oscillator X3, PWM comparator X4, and ground fault detector X5) that are integrated within the multi-output power supply device 1. The external terminal T1 is connected to the other end of the coil L3. The external terminal T2 is connected to a load not shown in the drawing, as well as to the ground terminal by a path via the output capacitor C3, and by a path via a voltage divider circuit composed of the resistor R2 and the resistor R3. The external terminal T3 is connected to the ground terminal. The external terminal T4 is connected to the connection nodes of the resistor R2 and resistor R3. An external terminal T5 is connected to the enable signal output terminal of a host (set-side CPU (Central Processing Unit) or the like) not shown in the drawing. The enable signal ENUP presented to the external terminal T5 is inputted to the control unit X1 and used to control enabling and disabling of the step-up operation.

The basic operation (step-up operation) of the step-up DC/DC converter 30 configured as described above will first be described.

The transistor M2 is an output transistor controllably switched (opened/closed) according to a second gate voltage from the control unit X1, and the transistor M1 is a synchronous rectifier transistor controllably switched (opened/closed) according to a first gate voltage from the control unit X1.

To boost the input voltage Vin (=power supply voltage VCC) and obtain the output voltage Vout (which corresponds to the output voltage VDCO3), the control unit X1 controls switching of the transistor M1 and transistor M2 in complementary fashion upon switching on the transistor M3 and switching off the transistor M4 and transistor M5.

The term "complementary" used in the present specification includes a case in which the on/off states of the transistors M1, M2 are completely reversed, as well as a case in which a predetermined delay is applied to the on/off transition timing of the transistors M1, M2 to prevent through-currents.

When the transistor M2 is switched on, a coil current IL directed toward the ground terminal via the transistor M2 flows to the coil L3, and the electrical energy of the coil current IL is accumulated. During the period in which the transistor M2 is on, a current from the output capacitor C6 flows to the load (not shown) connected to the external terminal T2 in a case in which a charge has already been accumulated in the output capacitor C6. At this time, since the transistor M1, which is a synchronous rectifier element, is switched off in a fashion complementary to the on state of the transistor M2, no current flows from the output capacitor C6 to the transistor M2.

On the other hand, when the transistor M2 is switched off, the electrical energy accumulated therein is discharged by a back electromotive force generated in the coil L3. At this time, since the transistor M1 is switched on in a fashion complementary to the off state of the transistor M2, the current flowing from the external terminal T1 via the transistor M1 flows to the load from the external terminal T2 as well as to the ground terminal via the output capacitor C6, and charges the output capacitor C6. By the repetition of the operation described above, a smoothed output voltage Vout is fed to the load by the output capacitor C6.

The step-up DC/DC converter 30 of the present example thus boosts the input voltage Vin (=power supply voltage VCC) by controlling the switching of the transistors M1, M2, and generates the output voltage Vout.

Feedback control of the step-up DC/DC converter 30 configured as described above will next be described.

The error amplifier X2 amplifies the difference between an output feedback voltage Vfb (corresponding to the actual value of the output voltage Vout) brought out from the connection node between the resistor R2 and the resistor R3, and a predetermined reference voltage Vref (corresponding to the target value of the output voltage Vout), and generates an error voltage Verr. Specifically, the voltage level of the error voltage Verr is higher the lower the output voltage Vout is than the target value. The oscillator X3 generates a sawtooth voltage Vsaw having a predetermined frequency.

The PWM comparator X4 compares the error voltage Verr and the sawtooth voltage Vsaw and generates a PWM signal S1. Specifically, the on duty (ratio of the on period of the transistor M2 per unit time) of the PWM signal S1 sequentially varies according to the levels of the error voltage Verr and the sawtooth voltage Vsaw relative to each other. Specifically, the on duty of the PWM signal S1 is higher the lower the output voltage Vout is than the target value thereof, and the on duty of the PWM signal S1 decreases as the output voltage Vout approaches the target value thereof.

The control unit X1 controls the switching of the transistor M1 and the transistor M2 in complementary fashion according to the PWM signal S1 when the input voltage Vin (=power supply voltage VCC) is boosted to obtain the output voltage Vout. Specifically, the control unit X1 switches on the transistor M2 and switches off the transistor M1 while the PWM signal S1 is at the high level, and switches off the transistor M2 and switches on the transistor M1 while the PWM signal S1 is at the low level.

The step-up DC/DC converter 30 of the present example thus causes the output voltage Vout to conform to the target value thereof by output feedback control based on the error voltage Verr.

Figure 16:
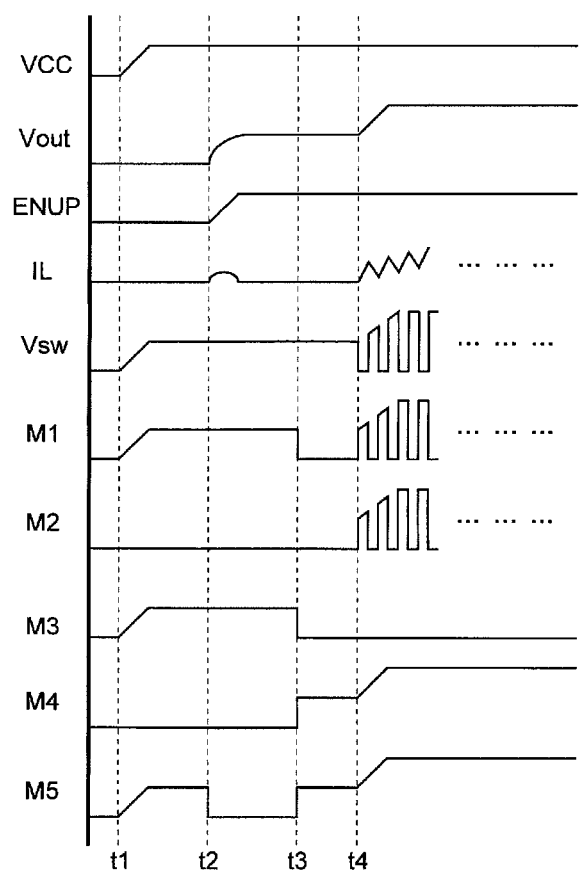
FIG. 16 is a correlation chart showing the operating states of the step-up DC/DC converter 30 and the on/off states of the transistors M1 through M5.

The startup operation and ground fault protection operation of the step-up DC/DC converter 30 configured as described above will next be described in detail with reference to FIGS. 16 and 17. FIG. 16 is a timing chart showing the startup operation of the step-up DC/DC converter 30, and FIG. 17 is a correlation chart showing the operating states of the step-up DC/DC converter 30 and the on/off states of the transistors M1 through M5. FIG. 16 shows, in order from the top, the power supply voltage VCC, the output voltage Vout, the enable signal ENUP, the coil current IL, the switch voltage Vsw (voltage at the switch terminal T1), and the gate voltages (first through fifth gate signals) of the transistors M1 through M5.

After the power supply voltage VCC has been applied to the step-up DC/DC converter 30 at time t1, the step-up DC/DC converter 30 is in a standby state (waiting state for the step-up operation) at time t2 until the enable signal ENUP rises from the low level to the high level.

In the abovementioned standby state, the control unit X1 switches on the transistor M4 alone, and switches off all the other transistors M1, M2, M3, and M5. Specifically, the control unit X1 switches the gate voltages of the transistor M2 and the transistor M4 to the low level (GND), and switches the gate voltages of the transistor M1, transistor M3, and transistor M5 to the high level (VCC).

By controlling the gate voltages as described above, all of the current leak paths from the external terminal T1 to the external terminal T2 can be reliably blocked, including the current leak path via the parasitic diode attached to the transistor M1.

Since switching on the transistor M4 enables the back gates of the transistors M1, M3, M4, M5 to be connected to the highest potential (switch voltage Vsw (=power supply voltage VCC)) in the standby state, the on states of the transistors M1, M3, M5 can be made more reliable.

After the enable signal ENUP has risen from the low level to the high level at time t2, the step-up DC/DC converter 30 enters a first startup state (pre-charge state of the output capacitor C6) until a predetermined time Tx has elapsed (time t2 to time t3).

In the first startup state, the control unit X1 switches on the transistor M4 and the transistor M5, and switches off the transistors M1 through M3. Specifically, the control unit X1 switches the gate voltages of the transistor M2, the transistor M4, and the transistor M5 to the low level (GND), and switches the gate voltages of the transistor M1 and the transistor M3 to the high level (VCC).

By controlling the gate voltages in this manner, the transistor M5 having a higher on-resistance value than the transistor M1 is switched on for the predetermined period Tx before the start of switching control of the transistor M1 during the transition from the standby state to the active state, and the output capacitor C6 can be gradually charged along the current path via the transistor M5. A large inrush current can therefore be prevented from flowing into the output capacitor C6, and the power supply voltage VCC can be prevented from decreasing.

When the enable signal ENUP has risen to the high level, the step-up DC/DC converter 30 changes to the abovementioned first startup state after waiting until the power supply voltage VCC has reached a predetermined voltage level in a case when the power supply voltage VCC is not activated, or in a case when the power supply voltage VCC has not increased to a predetermined voltage level.

The control unit X1 may also be configured so as to control sweeping of the gate voltage of the transistor M5 from the high level (VCC) to the low level (GND) so as to gradually increase the degree of conduction of the transistor M5 when the transistor M5 is switched on in the abovementioned first startup state. Through such a configuration, the current flowing into the output capacitor C6 via the transistor M5 can be gradually increased, and inrush currents can therefore be even further suppressed.

At time t3, the step-up DC/DC converter 30 enters a second startup state (state of preparation for transition to the active state) that lasts until a predetermined period Ty (time t3 to time t4) has elapsed after the first startup state has ended.

In the second startup state, the control unit X1 switches on the transistor M1 and the transistor M3, and switches off the transistor M2, the transistor M4, and the transistor M5. Specifically, the control unit X1 switches the gate voltages of the transistors M1 through M3 to the low level (GND), and switches the gate voltages of the transistor M4 and the transistor M5 to the high level (VCC).

By controlling the gate voltages in this manner, pre-charging of the output capacitor C6 can be continued because the transistor M1 is switched on at the same time that the transistor M5 is switched off prior to the transition to the active state.

The means for timing the predetermined periods Tx, Ty can be configured so that a timer (counter) is used to begin counting at the same time the standby state is released, or that a soft start voltage Vss is monitored whose voltage level begins to gradually increase at the same time that the standby state is released, and a transition from the first startup state to the second startup state, as well as a transition from the second startup state to the active state, is carried out based on the result of comparing the soft start voltage Vss and threshold voltages Vx, Vy (which correspond to the predetermined periods Tx, Ty, respectively).

The soft start voltage Vss may be used as the reference voltage Vref inputted to the non-inverting input terminal (+) of the error amplifier X2; or a configuration may be adopted in which the error voltage Verr and the soft start voltage Vss are inputted in parallel to the non-inverting input terminal (+)

of the PWM comparator X4, and sawtooth voltage Vsaw and the lower of the error voltage Verr and the soft start voltage Vss are compared in the PWM comparator X4.

At time t4, when the second startup state has ended, the step-up DC/DC converter 30 enters the active state (step-up operation state).

In the active state, the control unit X1 controls switching of the transistor M1 and transistor M2 in complementary fashion after switching on the transistor M3 and switching off the transistor M4 and transistor M5, as described above. Specifically, the control unit X1 drives the gate voltages of the transistor M1 and the transistor M2 in pulses between low level (GND) and high level (Vout) after fixing the gate voltage of the transistor M3 at the low level (GND) and fixing the gate voltages of the transistor M4 and the transistor M5 at the high level (Vout).

By controlling the gate voltages in this manner, the switching of the transistors M1, M2 is controlled in complementary fashion, and the input voltage Vin (=power supply voltage VCC) can be boosted to generate the output voltage Vout.

The control unit X1 also monitors a ground fault detection signal S2 from the ground fault detector X5, and when a determination is made that a ground fault has occurred at the external terminal T2 (i.e., the ground fault detection signal S2 has reached a high level at a timing other than immediately after startup), the control unit X1 switches on both the transistor M4 and the transistor M5, and switches off the transistors M1 through M3. Specifically, when a ground fault is detected, the control unit X1 switches the gate voltages of the transistor M2, the transistor M4, and the transistor M5 to the low level (GND) and switches the gate voltages of the transistor M1 and the transistor M3 to the high level (Vcc). This state, which occurs when a ground fault is detected, is the same as the first startup state.

Controlling the gate voltages in this manner allows electric current to flow in a path via the transistor M5, which has a higher on-resistance value than the transistor M1, when a ground fault is detected, and the peak value of the overcurrent can therefore be kept low.

Figure 18:
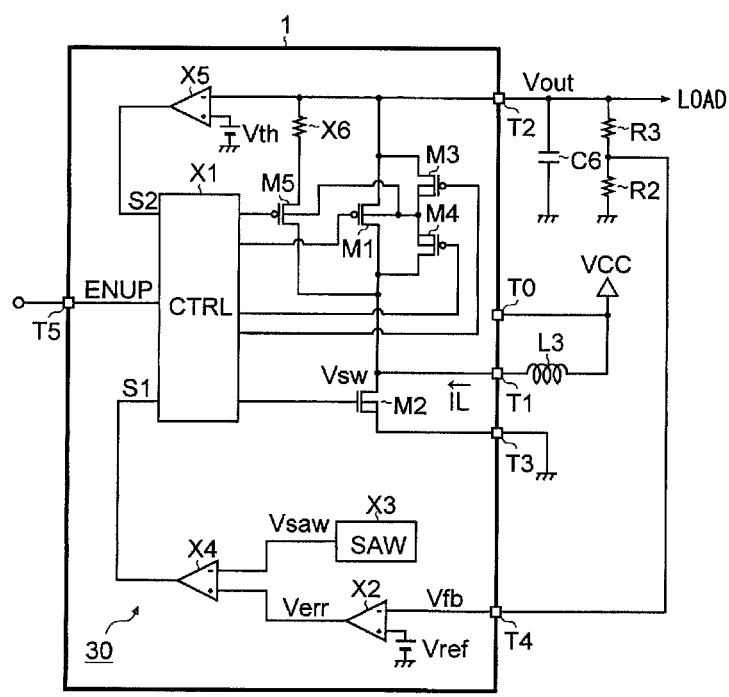
FIG. 18 is a circuit block diagram showing a second example of the structure of the step-up DC/DC converter 30.

FIG. 18 is a circuit block diagram showing a second example of the structure of the step-up DC/DC converter 30. In the first example described previously, only the transistor M5 is provided as a current-limiting element for suppressing the current that flows between the time of startup and the time an output ground fault occurs, but in the step-up DC/DC converter 30 of the second example, not only is the transistor M5 provided as a current-limiting element (*3), but a current-limiting resistor X6 connected in series to the transistor M5 is also provided, as shown in FIG. 18.

Through this configuration, there is no need to design the transistor M5 so as to have an extremely high on resistance, making it possible to overcome problems such as inadequate withstand voltage of the transistor M5 that accompany reducing the element size. In a configuration that uses a current-limiting resistor X6, the resistance value of the current-limiting resistor X6 can be arbitrarily and easily adjusted by laser trimming, and current can therefore be limited according to the allowable power dissipation and other characteristics of the multi-output power supply device 1.

In FIG. 18, an example is shown in which the current-limiting resistor X6 is inserted between the external terminal T2 and the source of the transistor M5, but the position at which the current-limiting resistor X6 is inserted is not limited to this configuration, and the current-limiting resistor X6 may be inserted between the external terminal T1 (or external terminal T0) and the drain of the transistor M5, or in both positions.

Figure 19:
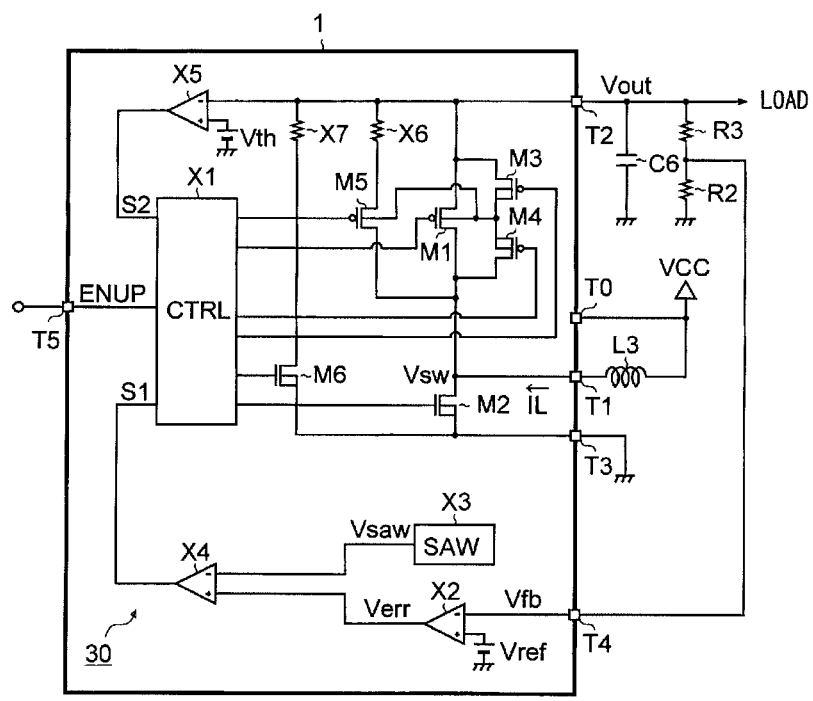
FIG. 19 is a circuit block diagram showing a third example of the structure of the step-up DC/DC converter 30.

FIG. 19 is a circuit block diagram showing a third example of the structure of the step-up DC/DC converter 30. Unlike the first and second examples previously described, the step-up DC/DC converter 30 of the third example has an N-channel type MOS field-effect transistor M6 (discharge transistor) for output voltage discharge connected between the external terminal T2 and the external terminal T3, and a current-limiting resistor X7 connected in series to the transistor M6, as shown in FIG. 19.

FIG. 20 is a correlation chart showing the operating modes (operating states) of the step-up DC/DC converter 30 and the on/off states of the transistors M1 through M6.

The VCC output mode is an operating mode that corresponds to the second startup state shown in FIG. 17, in which only the transistor M3 is switched on whereas the other transistors M1, M2, and M4 through M6 are all switched off. The conditions for selecting the VCC output mode are that a thermal shutdown occur and an overcurrent be detected. For example, in a case in which a short circuit occurs in the coil L3, the step-up DC/DC converter 30 enters the VCC output mode, and the output transistor M2 is switched off. The overcurrent flowing to the output transistor M2 can therefore be promptly suppressed, and destruction of the element can be prevented. The transistor M1 may be on or off at this time, but in the VCC output mode, the transistor M1 is switched on. Since the power supply voltage VCC is thereby outputted to the external terminal T2, erroneous detection by the ground fault detection comparator X5 can be prevented.

The inrush current suppression mode is an operating mode that corresponds to the first startup state (or the output ground fault (*4) state) shown in FIG. 17. In this state the transistors M4, M5 are switched on whereas the other transistors M1 through M3 and the transistor M6 are all switched off. The conditions for selecting the inrush current suppression mode are that a step-up DC/DC output be started and an output voltage be short-circuited, as described above.

The output voltage discharge mode is an operating mode that corresponds to the standby state shown in FIG. 17. In this mode the transistors M4, M6 are switched on whereas the other transistors M1 through M3 and the transistor M5 are switched off. The conditions for selecting the output voltage discharge mode are that an UVLO operation be established, overvoltage muting be in operation, the enable signal ENUP be at the low level (when enabling of the step-up DC/DC converter 30 is off), and the step-up DC/DC timer perform a latch operation. Discharging the output voltage Vout in this manner allows output operation of the step-up DC/DC converter 30 to be resumed from a state in which the charge of the output capacitor C6 has run out (the output voltage Vout is zero). Since there is also no possibility of the output voltage Vout being unintentionally applied to the load connected to the external terminal T2, the reliability of the set can also be enhanced.

Figure 21:
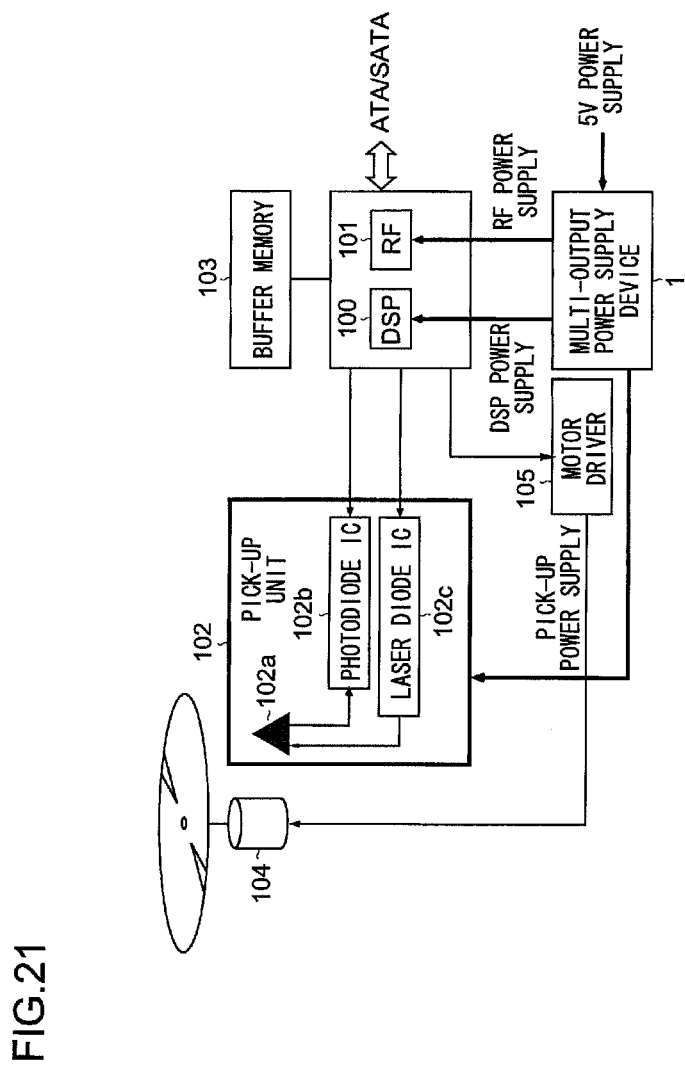
FIG. 21 is a block diagram showing an example of application to an optical disk device.

FIG. 21 is a block diagram showing an example of application to an optical disk device. The optical disk device of the present example has a DSP (Digital Signal Processor) 100, an RF (Radio Frequency) circuit 101, a pickup unit 102 (including an optical pickup 102a, a photodiode IC 102b, and a laser diode IC 102c), a buffer memory 103, a spindle motor 104, and a motor driver 105. In addition, the optical disk device uses the multi-output power supply device 1 of the present embodiment as a one-chip power supply IC for collectively managing the power supply to the DSP 100, RF circuit 101, and pickup unit 102.

The output voltages of the step-down DC/DC converters 10, 20 are used as the DSP power supply and the RF power supply, respectively, and the output voltage of the step-up DC/DC converter 30 is used as the pickup power supply.

Adopting such a configuration makes it possible to prevent malfunctioning of the pickup unit 102 or breakdown of the laser diode IC 102c included in the pickup unit 102. Reducing the number of components also contributes to smaller size and smaller space requirements. Startup problems can also be prevented by suppressing step-up DC/DC rush currents.

A tray opening and closing detection system provided to an optical disk device will next be described in detail.

Figure 22:
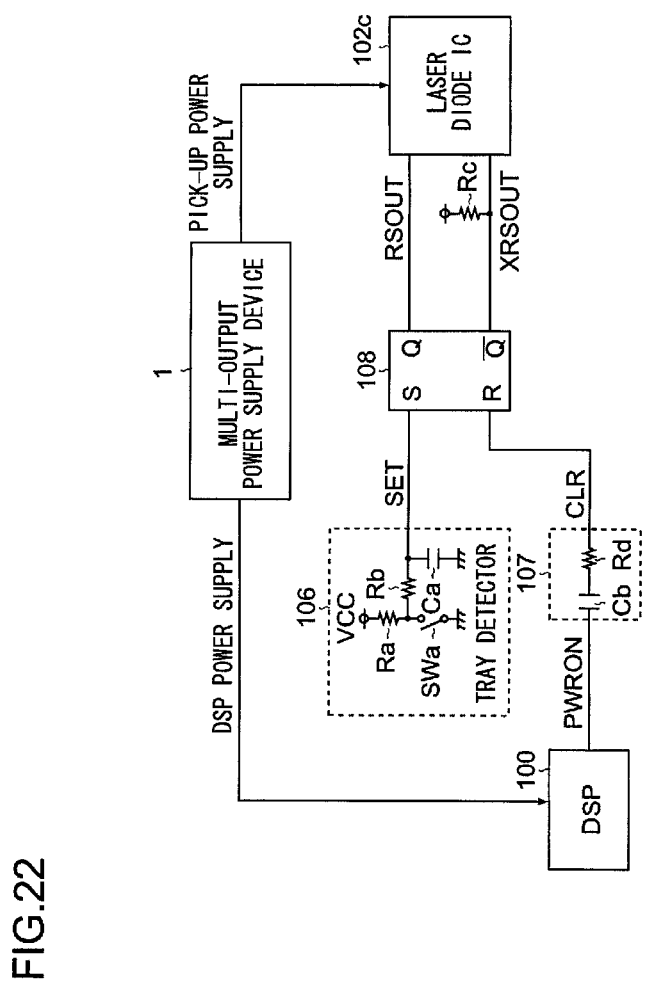
FIG. 22 is a block diagram showing a first example of the structure of a tray opening and closing detection system.

FIG. 22 is a block diagram showing a first example of the structure of a tray opening and closing detection system. The optical disk device of the present example has the previously described multi-output power supply device 1, DSP 100, and laser diode IC 102c, as well as a tray detector 106, a CR differential pulse generator 107, and an RS latch unit 108.

The tray detector 106 is a means for detecting the opening and closing state of a disk tray on which an optical disk is mounted, and the tray detector 106 is composed of resistors Ra, Rb, a switch SWa, and a capacitor Ca. One end of the resistor Ra is connected to an application terminal for the power supply voltage VCC. The other end of the resistor Ra is connected to one end of the switch SWa and one end of the resistor Rb. The other end of the switch SWa is connected to the ground terminal. The other end of the resistor Rb is connected to one end of the capacitor Ca. The other end of the capacitor Ca is connected to the ground terminal. In the tray detector 106 configured as described above, the switch SWa is off (open) when the disk tray is open. As a result, the capacitor Ca is charged, and the set signal SET derived from one end thereof is at the high level. The switch SWa is on (closed) when the disk tray is closed. As a result, the capacitor Ca is discharged, and the set signal derived from one end thereof is at the low level.

The CR differential pulse generator 107 is a means for differentiating a power-on signal PWRON outputted from the DSP 100 and generating a clear signal CLR, and is composed of a resistor Rd and a capacitor Cb that are connected in series between a power-on signal output terminal of the DSP 100 and a reset terminal (R) of the RS latch unit 108.

The RS latch unit 108 sets a positive-phase latch output signal RSOUT to the high level and sets a negative-phase latch output signal XRSOUT to the low level at the rising edge of a set signal SET inputted to a set terminal (S). At the rising edge of the clear signal CLR inputted to the reset terminal (R), the RS latch unit 108 resets the positive-phase latch output signal RSOUT to the low level and resets the negative-phase latch output signal XRSOUT to the high level.

The laser diode IC 102c allows/prohibits activation of the laser light on the basis of the positive-phase latch output signal RSOUT and negative-phase latch output signal XRSOUT from the RS latch unit 108. Specifically, activation of the laser light is allowed when the positive-phase latch output signal RSOUT is at the low level and the negative-phase latch output signal XRSOUT is at the high level, and activation of the laser light is prohibited when the positive-phase latch output signal RSOUT is at the high level and the negative-phase latch output signal XRSOUT is at the low level.

Figure 23:
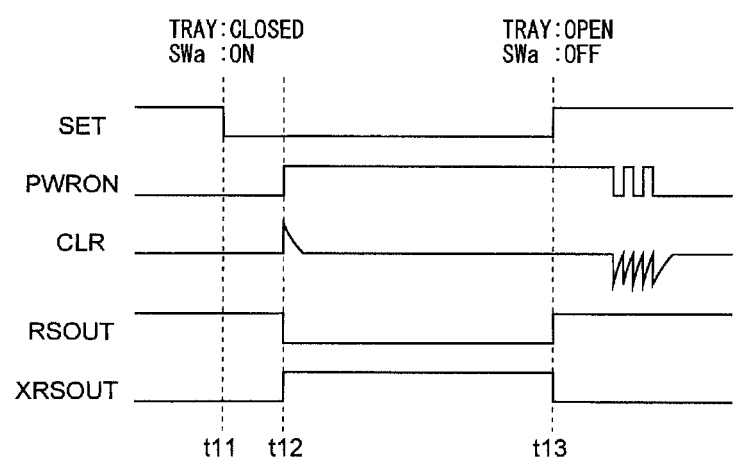
FIG. 23 is a timing chart showing an example of the operation of laser control based on detection of the opening and closing of the tray.

FIG. 23 is a timing chart showing an example of the operation of laser control by the tray opening and closing detection system according to the first example, and shows, in order from the top, the set signal SET, the power-on signal PWRON, the clear signal CLR, the positive-phase latch output signal RSOUT, and the negative-phase latch output signal XRSOUT.

When the disk tray is closed and the switch SWa is switched on at time t11, the set signal SET falls from the high level to the low level. The power-on signal PWRON of the DSP 100 then rises from the low level to the high level at time t12, whereupon a CR differential pulse rises in the clear signal CLR. In the RS latch unit 108, the rising edge of the clear signal CLR triggers resetting of the positive-phase latch output signal RSOUT to the low level and resetting of the negative-phase latch output signal XRSOUT to the high level. As a result, after time t12, the laser diode IC 102c is in a state in which activation of the laser light is allowed. Then, at time t13, the disk tray is opened, and the switch SWa is switched off, whereupon the set signal SET is raised from the low level to the high level. In the RS latch unit 108, the rising edge of the set signal SET triggers setting of the positive-phase latch output signal RSOUT to the high level and setting of the negative-phase latch output signal XRSOUT to the low level. As a result, after time t13, the laser diode IC 102c is in a state in which activation of the laser light is prohibited.

Controlling the laser by the tray opening and closing detection system of the first example causes activation of the laser light to be prohibited when the disk tray is open. There is therefore no risk of eye exposure to the laser light, and the safety of the optical disk device can be increased. In the tray opening and closing detection system according to the first example, the positive-phase latch output signal RSOUT and the negative-phase latch output signal XRSOUT are both maintained in a set state even when the power-on signal PWRON cycles between on and off due to noise or other effects at the time the power-on signal PWRON of the DSP 100 is off (low level), and there is therefore no risk of the laser light being activated by mistake even.

Figure 24:
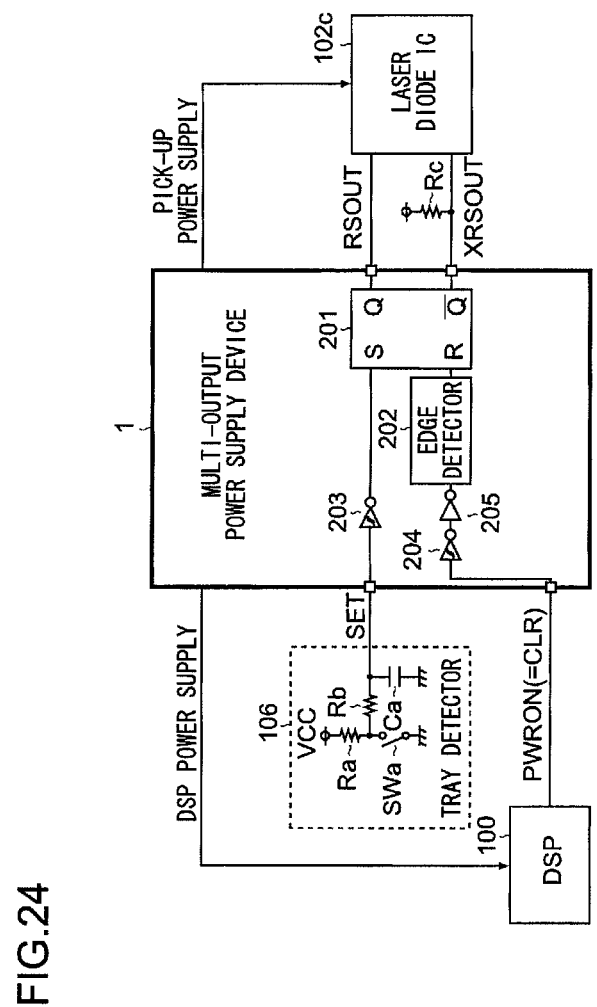
FIG. 24 is a block diagram showing a second example of the structure of a tray opening and closing detection system.

FIG. 24 is a block diagram showing a second example of the structure of the tray opening and closing detection system. The tray opening and closing detection system of the present example differs from that of the first example in that the CR differential pulse generator 107 and RS latch unit 108 formed in the first example by external discrete components are omitted, and instead, an RS latch unit 201, an edge detector 202, and inverters 203 through 205 are integrated within the multi-output power supply device 1.

Figure 25:
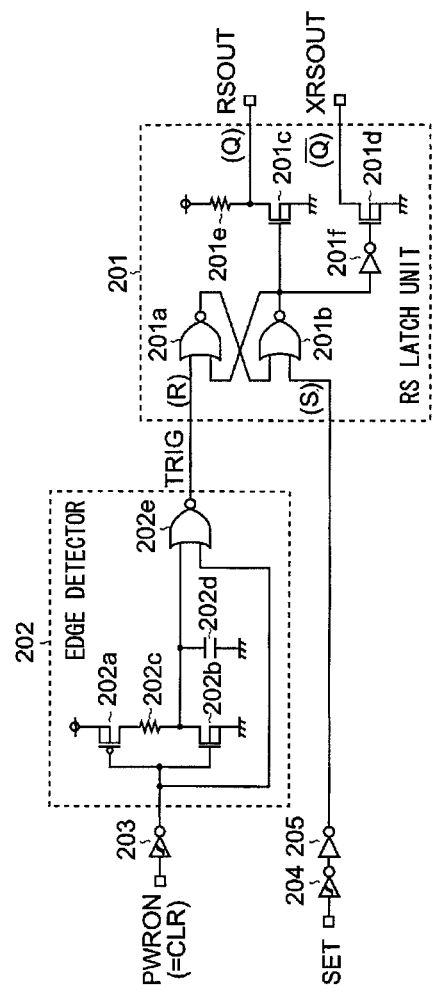
FIG. 25 is a circuit diagram showing an example of the structure of the RS latch unit 201 and edge detector 202.

FIG. 25 is a circuit diagram showing an example of the structure of the RS latch unit 201 and edge detector 202.

The RS latch unit 201 is composed of NOR computing units 201a and 201b (hereinafter referred to as NAND 201a and 201b), N-channel type MOS field-effect transistors 201c and 201d, a resistor 201e, and an inverter 201f. A first input terminal of the NAND 201a corresponds to the reset terminal (R) of the RS latch unit 201, and is connected to the output terminal (output terminal for the trigger signal TRIG) of the edge detector 202. A second input terminal of the NAND 201a is connected to the output terminal of the NAND 201b. The first input terminal of the NAND 201b is connected to the output terminal of the NAND 201a. The second input terminal of the NAND 201b corresponds to the set terminal (S) of the RS latch unit 201, and is connected to the output terminal of the inverter 205. The input terminal of the inverter 205 is connected to the output terminal of the inverter 204. The input terminal of the inverter 204 is connected to the output terminal (output terminal for the set signal SET) of the tray detector 106. The gate of the transistor 201c is connected to the output terminal of the NAND 201b. The source and back gate of the transistor 201c are connected to the ground terminal. The drain of the transistor 201c is connected to the power supply terminal via the resistor 201e, as well as to the laser diode IC 102c as the positive-phase output terminal (Q)(output terminal for the positive-phase latch output signal RSOUT) of the RS latch unit 201. The gate of the transistor 201*d* is connected to the output terminal of the inverter 201*f*. The input terminal of the inverter 201*f* is connected to the output terminal of the NAND 201*b*. The source and back gate of the transistor 201*d* are connected to the ground terminal. The drain of the transistor 201*d* is connected to the laser diode IC 102*c* as the negative-phase output terminal (Q-bar) (output terminal for the negative-phase latch output signal XRSOUT) of the RS latch unit 201.

The edge detector 202 is composed of a P-channel type MOS field-effect transistor 202*a*, an N-channel type MOS field-effect transistor 202*b*, a resistor 202*c*, a capacitor 202*d*, and a NOR computing unit 202*e* (hereinafter referred to as a NAND 202*e*). The source and back gate of the transistor 202*a* are connected to the power supply terminal. The drain of the transistor 202*a* is connected to one end of the resistor 202*c*. The source and back gate of the transistor 202*b* are connected to the ground terminal. The drain of the transistor 202*b* is connected to the other end of the resistor 202*c*. The gate of the transistor 202*a* and the gate of the transistor 202*b* are connected to each other, and the connection node thereof is connected to the output terminal of the inverter 203. The input terminal of the inverter 203 is connected to the output terminal (output terminal for the power-on signal PWRON (=clear signal CLR)) of the DSP 100. One end of the capacitor 202*d* is connected to the drain of the transistor 202*b*. The other end of the capacitor 202*d* is connected to the ground terminal. The first input terminal of the NAND 202*e* is connected to the drain of the transistor 202*b*. The second input terminal of the NAND 202*e* is connected to the output terminal of the inverter 203. The output terminal of the NAND 202*e* is connected to the reset terminal (R) of the RS latch unit 201 as the output terminal (output terminal for the trigger signal TRIG) of the edge detector 202.

The inverters 203 and 204 are preferably configured so as to have hysteresis in the threshold values for switching the output logic of the inverters. Such a configuration makes it possible to increase noise resistance.

Figure 26:
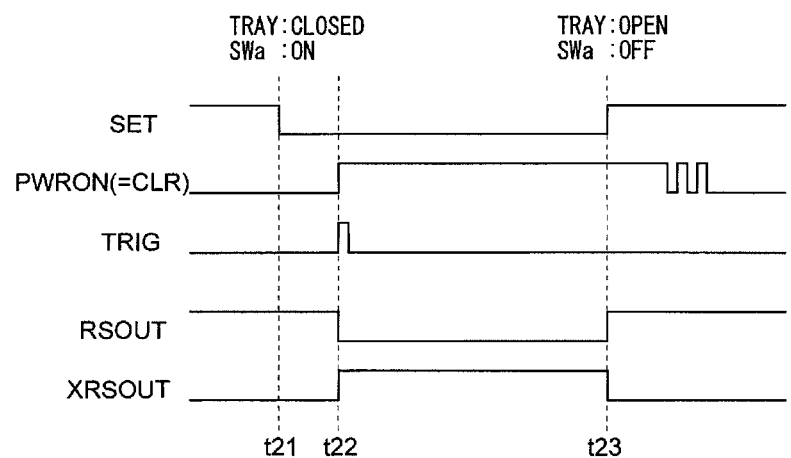
FIG. 26 is a timing chart showing an example of the manner in which laser control is performed based on detection of the opening and closing of the tray.
Figure 27A:
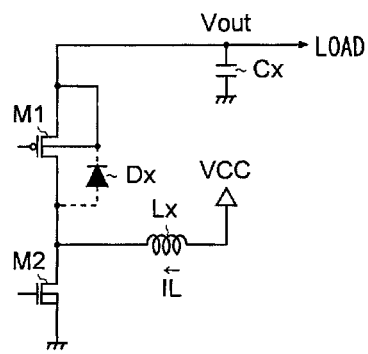
FIG. 27A is a circuit diagram showing a first example of a conventional step-up switching power supply device.
Figure 27B:
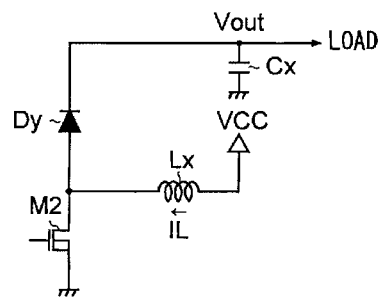
FIG. 27B is a circuit diagram showing a second example of a conventional step-up switching power supply device.
Figure 27C:
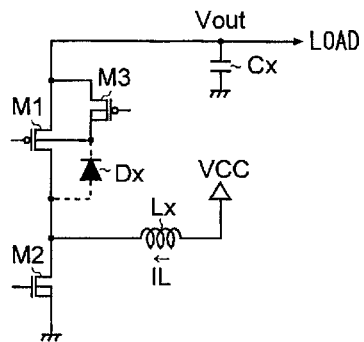
FIG. 27C is a circuit diagram showing a third example of a conventional step-up switching power supply device.

FIG. 26 is a timing chart showing an example of the manner in which laser control is performed by the tray opening and closing detection system of the second example, and shows, in order from the top, the set signal SET, the power-on signal PWRON (=clear signal CLR), the trigger signal TRIG, the positive-phase latch output signal RSOUT, and the negative-phase latch output signal XRSOUT.

When the disk tray is closed and the switch SWa is switched on at time t21, the set signal SET falls from the high level to the low level. The power-on signal PWRON (=clear signal CLR) of the DSP 100 then rises from the low level to the high level at time t22, whereupon the rising edge of the power-on signal PWRON (=clear signal CLR) is detected by the edge detector 202, and a rectangular pulse rises in the trigger signal TRIG. In the RS latch unit 201, the rising edge of the trigger signal TRIG triggers resetting of the positive-phase latch output signal RSOUT to the low level and resetting of the negative-phase latch output signal XRSOUT to the high level. As a result, after time t22, the laser diode IC 102*c* is in a state in which activation of the laser light is allowed. Then, at time t23, the disk tray is opened, and the switch SWa is switched off, whereupon the set signal SET is raised from the low level to the high level. In the RS latch unit 201, the rising edge of the set signal SET triggers setting of the positive-phase latch output signal RSOUT to the high level and setting of the negative-phase latch output signal XRSOUT to the low level. As a result, after time t23, the laser diode IC 102*c* is in a state in which activation of the laser light is prohibited.

In the tray opening and closing detection system of the second example, the same effects as those of the tray opening and closing detection system of the first example can be obtained while significantly reducing the number of external discrete components, and the size and cost of the optical disk device can therefore be reduced.

The present invention may be configured according to the embodiment described above, and various modifications may also be added within the intended scope of the invention. For example, the embodiment described above was of an example in which two step-down DC/DC converters and one step-up DC/DC converter are provided as a plurality of power supply circuits built into an IC, but the present invention is not limited to this configuration, and any number of power supply circuit systems may be built into the IC.

Specifically, a best mode for carrying out the invention is described above, but it will be readily apparent to one skilled in the art that the disclosed invention can be modified in a variety of ways, and that various embodiments are possible that differ from the configuration specifically described above. The claims included below are therefore intended to encompass all modifications of the present invention within the intended scope and technical field of the present invention.

Lastly, the industrial applicability of the present invention will be described. The present invention is a useful technique for increasing the reliability of a step-up switching power supply device, and can be utilized in any electronic device in which an output voltage higher than the input voltage is required (e.g., Blu-ray disk drives and other optical disk drives, or digital still cameras, digital video cameras, mobile telephones, and other portable devices).

LIST OF REFERENCE NUMERALS

1: multi-output power supply device
10: step-down DC/DC converter (1.2 V output)
11: P-channel MOS field-effect transistor (output switch)
12: N-channel MOS field-effect transistor (synchronous rectifier switch)
13: control drive unit
14: error amplifier
15: PWM comparator
16: current limiter
20: step-down DC/DC converter (3.3 V output)
21: P-channel MOS field-effect transistor (output switch)
22: N-channel MOS field-effect transistor (synchronous rectifier switch)
23: control drive unit
24: error amplifier
25: PWM comparator
26: current limiter
30: step-up DC/DC converter
31: N-channel MOS field-effect transistor (output switch)
32: P-channel MOS field-effect transistor (synchronous rectifier switch)
33: control drive unit
34: error amplifier
35: PWM comparator
36: current limiter
37: back-gate control unit
40: reset circuit
50: current switch
51: P-channel MOS field-effect transistor
52: control drive unit
53: current limiter
531: overcurrent detection comparator 532: output voltage detection comparator
60: LED driver
61: P-channel MOS field-effect transistor
62: control drive unit
63: current limiter
70: sawtooth wave generation circuit
80: reference voltage generation circuit
91-93: buffers
100: DSP
101: RF circuit
102: pickup unit
102a: optical pickup
102b: photodiode IC
102c: laser diode IC
103: buffer memory
104: spindle motor
105: motor driver
106: tray detector
107: CR differential pulse generator
108: RS latch unit
201: RS latch unit
201a, 201b: NOR computing units (NAND)
201c, 201d: N-channel type MOS field-effect transistors
201e: resistor
201f: inverter
202: edge detector
202a: P-channel type MOS field-effect transistor
202b: N-channel type MOS field-effect transistor
202c: resistor
202d: capacitor
202e: NOR computing unit (NAND)
203, 204: inverters (with hysteresis)
205: inverter (without hysteresis)
L1-L3: coils
C1-C7: capacitors
R1-R4: resistors
SW1-SW3, SWa: switches
P: backside pad
X1: control unit
X2: error amplifier
X3: oscillator
X4: PWM comparator
X5: ground fault detector (comparator)
X6: current-limiting resistor
X7: current-limiting resistor
M1: synchronous rectifier transistor (P-channel MOS transistor)
M2: output transistor (N-channel MOS transistor)
M3: first back-gate control transistor (P-channel MOS transistor)
M4: second back-gate control transistor (P-channel MOS transistor)
M5: current-limiting transistor (P-channel MOS transistor)
M6: discharge transistor (N-channel MOS transistor)
T1-T5: external terminals
Ra-Rd: resistors
Ca, Cb: capacitors
SWa: switch

What is claimed is:

1. A step-up switching power supply device comprising:
   a coil, one end of which is connected to an input terminal for an input voltage;
   an output transistor connected between another end of said coil and a ground terminal;
   a synchronous rectifier transistor connected between the other end of said coil and an output terminal for an output voltage;
   an output capacitor connected between a ground terminal and the output terminal for said output voltage;
   a first back-gate control transistor connected between a back gate of said synchronous rectifier transistor and the output terminal for said output voltage;
   a discharge transistor connected between a ground terminal and the output terminal for said output voltage;
   a second back-gate control transistor connected between a back gate of said synchronous rectifier transistor and the other end of said coil;
   a current-limiting transistor connected between the other end of said coil and the output terminal for said output voltage; and
   a control unit for controlling the on/off state of said output transistor, said synchronous rectifier transistor, said first back-gate control transistor, said discharge transistor, said second back-gate control transistor, and said current-limiting transistor;
   wherein
   said current-limiting transistor has a larger on-resistance value than said synchronous rectifier transistor, and
   said control unit switches off said first back-gate control transistor, switches on said discharge transistor, switches on said second buck-gate control transistor, and switches off said current-limiting transistor when stopping a switching operation of said output transistor and said synchronous rectifier transistor,
   said control unit switches on said current-limiting transistor before starting a switching operation of said output transistor and said synchronous rectifier transistor, and
   a back gate of the current-limiting transistor is connected to a connection node between the first back-gate control transistor and the second back-ante control transistor.

2. The step-up switching power supply device according to claim 1, further comprising a current-limiting resistor connected in series with said discharge transistor.

3. The step-up switching power supply device according to claim 1, wherein said control unit stops the switching operation of said output transistor and said synchronous rectifier transistor in a case in which said input voltage is below a predetermined lower-limit value, in a case in which said input voltage is above a predetermined upper limit, in a case in which a command to stop the step-up operation is issued from outside the device, or in a case in which an anomaly in the step-up operation is detected.

4. The step-up switching power supply device according to claim 1, further comprising:
   an error amplifier for amplifying the difference between a predetermined reference voltage and a feedback voltage that fluctuates according to said output voltage, and generating an error voltage;
   an oscillator for generating a predetermined sawtooth voltage; and
   a PWM comparator for comparing said error voltage and said sawtooth voltage and generating a PWM signal;
   wherein
   said control unit controls the switching of said output transistor and said synchronous rectifier transistor in complementary fashion on the basis of said PWM signal when said output voltage is generated from said input voltage.

5. A multi-output power supply device comprising:
   a control-device power supply circuit for generating an output voltage for a control device; and
   a controlled-device power supply circuit for generating an output voltage for a controlled device controlled by said control device; wherein said control-device power supply circuit is a step-down switching power supply device for stepping down an input voltage and generating an output voltage for said control device; and said controlled-device power supply circuit is a step-up switching power supply device according to claim 1 for boosting said input voltage and generating an output voltage for said controlled device.

6. An electric apparatus comprising:

a multi-output power supply device according to claim 5;

a control device operated by receiving a power feed from said multi-output power supply device; and a controlled device operated by receiving a power feed from said multi-output power supply device, and controlled by said control device.

7. A step-up switching power supply device comprising:

a coil, one end of which is connected to an input terminal for an input voltage;

a first transistor connected between another end of said coil and a ground terminal;

a second transistor connected between the other end of said coil and an output terminal for an output voltage;

an output capacitor connected between a ground terminal and the output terminal for said output voltage;

a third transistor connected between a back gate of said second transistor and the output terminal for said output voltage;

a fourth transistor connected between a ground terminal and the output terminal for said output voltage;

a fifth transistor connected between a back gate of said second transistor and the other end of said coil;

a sixth transistor connected between the other end of said coil and the output terminal for said output voltage; and a control unit for controlling the on/off state of said first transistor, said second transistor, said third transistor, said fourth transistor, said fifth transistor, and said sixth transistor;

wherein said sixth transistor has a larger on-resistance value than said second transistor, said control unit switches off said third transistor, switches on said fourth transistor, switches on said fifth transistor, and switches off said sixth transistor when stopping a switching operation of said first transistor and said second transistor, said control unit switches on said sixth transistor before starting a switching operation of said first transistor and said second transistor, and a back gate of the sixth transistor is connected to a connection node between the third transistor and the fifth transistor.

8. The step-up switching power supply device according to claim 7, further comprising a current-limiting resistor connected in series with said fourth transistor.

9. The step-up switching power supply device according to claim 7, wherein said control unit stops the switching operation of said first transistor and said second transistor in a case in which said input voltage is below a predetermined lower-limit value, in a case in which said input voltage is above a predetermined upper limit, in a case in which a command to stop the step-up operation is issued from outside the device, or in a case in which an anomaly in the step-up operation is detected.

10. The step-up switching power supply device according to claim 7, further comprising:

an error amplifier for amplifying the difference between a predetermined reference voltage and a feedback voltage that fluctuates according to said output voltage, and generating an error voltage;

an oscillator for generating a predetermined sawtooth voltage; and a PWM comparator for comparing said error voltage and said sawtooth voltage and generating a PWM signal; wherein said control unit controls the switching of said first transistor and said second transistor in complementary fashion on the basis of said PWM signal when said output voltage is generated from said input voltage.

11. A multi-output power supply device comprising:

a control-device power supply circuit for generating an output voltage for a control device; and a controlled-device power supply circuit for generating an output voltage for a controlled device, and controlled by said control device; wherein said control-device power supply circuit is a step-down switching power supply device for stepping down an input voltage and generating an output voltage for said control device; and said controlled-device power supply circuit is a step-up switching power supply device according to claim 7 for boosting said input voltage and generating an output voltage for said controlled device.

12. An electric apparatus comprising:

a multi-output power supply device according to claim 11;

a control device operated by receiving a power feed from said multi-output power supply device; and a controlled device operated by receiving a power feed from said multi-output power supply device and controlled by said control device.

13. A step-up switching power supply device comprising:

a first terminal to which an input voltage is inputted;

a first transistor connected between said first terminal and a ground terminal;

a second terminal to which an output voltage is outputted;

a second transistor connected between said first terminal and said second terminal;

a third transistor connected between said second terminal and a back gate of said second transistor;

a fourth transistor connected between a ground terminal and said second terminal;

a fifth transistor connected between said first terminal and a back gate of said second transistor;

a sixth transistor connected between said first terminal and said second terminal; and a control unit for controlling the on/off state of said first transistor, said second transistor, said third transistor, said fourth transistor, said fifth transistor, and said sixth transistor;

wherein said sixth transistor has a larger on-resistance value than said second transistor, said control unit switches off said third transistor, switches on said fourth transistor, switches on said fifth transistor, and switches off said sixth transistor when stopping a switching operation of said first transistor and said second transistor, said control unit switches on said sixth transistor before starting a switching operation of said first transistor and said second transistor, and a back gate of the sixth transistor is connected to a connection node between the third transistor and the fifth transistor.

14. The step-up switching power supply device according to claim 13, further comprising a current-limiting resistor connected in series with said fourth transistor.

15. The step-up switching power supply device according to claim 13, wherein said control unit stops the switching operation of said first transistor and said second transistor in a case in which said input voltage is below a predetermined lower-limit value, in a case in which said input voltage is above a predetermined upper limit, in a case in which a command to stop the step-up operation is issued from outside the device, or in a case in which an anomaly in the step-up operation is detected.

16. The step-up switching power supply device according to claim 13, further comprising:
 an error amplifier for amplifying the difference between a predetermined reference voltage and a feedback voltage that fluctuates according to said output voltage, and generating an error voltage;
 an oscillator for generating a predetermined sawtooth voltage; and
 a PWM comparator for comparing said error voltage and said sawtooth voltage and generating a PWM signal; wherein
 said control unit controls the switching of said first transistor and said second transistor in complementary fashion on the basis of said PWM signal when said output voltage is generated from said input voltage.

17. A multi-output power supply device comprising:
 a control device power supply circuit for generating an output voltage for a control device; and
 a controlled-device power supply circuit for generating an output voltage for a controlled device, and controlled by said control device; wherein
 said control-device power supply circuit is a step-down switching power supply device for stepping down an input voltage and generating an output voltage for said control device; and
 said controlled-device power supply circuit is a step-up switching power supply device according to claim 13 for boosting said input voltage and generating an output voltage for said controlled device.

18. An electric apparatus comprising:
 a multi-output power supply device according to claim 17;
 a control device operated by receiving a power feed from said multi-output power supply device; and
 a controlled device operated by receiving a power feed from said multi-output power supply device and controlled by said control device.

* * * * *